(12) United States Patent
Nakajima et al.

(10) Patent No.: US 7,650,134 B2
(45) Date of Patent: Jan. 19, 2010

(54) SEMICONDUCTOR INTEGRATED CIRCUIT DEVICE AND HIGH FREQUENCY POWER AMPLIFIER MODULE

(75) Inventors: Akishige Nakajima, Tokyo (JP); Yasushi Shigeno, Tokyo (JP); Takashi Ogawa, Tokyo (JP); Shinya Osakabe, Tokyo (JP); Tomoyuki Ishikawa, Hitachinaka (JP)

(73) Assignee: Renesas Technology Corp., Tokyo (JP)

( * ) Notice: Subject to any disclaimer, the term of this patent is extended or adjusted under 35 U.S.C. 154(b) by 599 days.

(21) Appl. No.: 11/512,189

(22) Filed: Aug. 30, 2006

(65) Prior Publication Data

US 2007/0049352 A1 Mar. 1, 2007

(30) Foreign Application Priority Data

Aug. 31, 2005 (JP) ............................. 2005-250497

(51) Int. Cl.
*H04B 1/16* (2006.01)

(52) U.S. Cl. ................. 455/341; 455/127.3; 455/194.2; 455/78; 455/144; 327/536; 327/404; 365/226

(58) Field of Classification Search ................. 455/341, 455/127.3, 194.2, 78, 144, 159.2, 253, 293; 327/536, 404; 365/226
See application file for complete search history.

(56) References Cited

U.S. PATENT DOCUMENTS 5,774,792 A 6/1998 Tanaka et al.

FOREIGN PATENT DOCUMENTS

| JP | 8-70245 | 3/1996 |
| JP | 2004-353715 | 12/2004 |
| JP | 2005-181669 | 7/2005 |

*Primary Examiner*—Minh D Dao
(74) *Attorney, Agent, or Firm*—Mattingly & Malur, P.C.

(57) ABSTRACT

In a SPDT switch, a resistor for leak path is connected between a terminal for antenna and a reference potential. The resistor for leak path allows charge capacitances accumulated in electrostatic capacitor elements provided as DC cut capacitors connected to transmission signal terminals and reception signal terminals to be discharged and allows rapid lowering of a potential at the terminal for antenna. In the SPDT switch, a switching characteristic is improved and a delay in the rising edge of a low-power slot which comes after a high-power slot is reduced.

16 Claims, 14 Drawing Sheets

FIG. 7

(SIMULATION VALUES)            PCS BAND

|  | POSITION OF INSERTED RESISTOR (IN DRAWINGS) | RESISTANCE VALUE OF RESISTOR FOR LEAK PATH | |
|---|---|---|---|
|  |  | 300kΩ | 200kΩ |
| TRANSMISSION MODE | NODE b | 0.0 (dBc) | 0.0 (dBc) |
|  | NODE c | 0.0 (dBc) | 0.0 (dBc) |
| RECEPTION MODE | NODE a | -0.010 (dBc) | -0.020 (dBc) |
|  | NODE d | -0.010 (dBc) | -0.020 (dBc) |
|  | NODE e | -0.010 (dBc) | -0.020 (dBc) |

FIG. 8

(SIMULATION VALUES)

| BAND | POSITION OF INSERTED RESISTOR (IN DRAWINGS) | DIFFERENCE IN HARMONIC DISTORTION WITH CONVENTIONAL CIRCUIT | |
|---|---|---|---|
|  |  | 2HD (dBc) | 3HD (dBc) |
| GSM (T×1) | NODE b | 2.4 | 0.2 |
|  | NODE c | -1.4 | -0.8 |
|  | NODE a | 2.4 | 0.2 |
|  | NODE d | -0.7 | -0.8 |
|  | NODE e | 0.2 | -0.7 |
| PCS (T×2) | NODE b | -3.9 | -0.6 |
|  | NODE c | 0.1 | 0.5 |
|  | NODE a | 0.1 | 0.5 |
|  | NODE d | -3.2 | -0.8 |
|  | NODE e | -2.4 | -0.6 |

RESISTANCE VALUE OF RESISTOR FOR LEAKAGE PATH: 300 kΩ

SEMICONDUCTOR INTEGRATED CIRCUIT DEVICE AND HIGH FREQUENCY POWER AMPLIFIER MODULE

CROSS-REFERENCE TO RELATED APPLICATION

The present application claims priority from Japanese patent application No. 2005-250497 filed on Aug. 31, 2005, the content of which is hereby incorporated by reference into this application.

BACKGROUND OF THE INVENTION

The present invention relates to a semiconductor integrated circuit device mounted on mobile communication equipment or the like and, more particularly, to a technology which is effective in reducing the distortion of a transmission/reception signal.

In recent years, mobile phones have developed a wide variety of services using data communication in addition to voice communication and are still continuing to evolve.

The representative frequency bands used by mobile phone services in Europe are the 900 MHz band for the GSM (Global System for Mobile Communicator) and the 1.8 GHz band for the DCS (Digital Cellular System), while the 1.9 GHz band for the PCS (Personal Communication Service) and the 850 MHz band for the GSM are used typically in the United States. In addition, the W-CDMA using the 2 GHz band has joined therein so that multiband/multimode capabilities are essential requirements for mobile terminals.

With the prevalence of such multiband/multimode mobile phones, a small-size and high-performance SPDT (Single-Pole Double-Throw) switch capable of switching a complicated RF signal has been in growing demand.

A primary requirement for the SPDT switch is the reduction of high-order harmonic distortions.

As an example of a technology for reducing the high-order harmonic distortions, there has been one which connects FETs (Field Effect Transistors) each composing the SPDT switch in multiple stages (see Patent Document 1).

During the transmission of power from a transmission circuit toward an antenna via the SPDT switch, the FETs which are respectively connected to a reception circuit and to the antenna and are in the OFF state are kept from being turned ON without being influenced by the power from the transmission circuit mentioned above. As a result, the inputted power is outputted to the antenna with no leakage to a reception system and, therefore, a low-loss switch can be implemented.

By connecting the FETs in multiple stages, an RF (Radio Frequency) voltage supplied to each of the FETs in a conducting state is distributed so that the RF voltage per stage, i.e., per FET is reduced advantageously. In other words, it can be said that the RF voltage supplied to the source-to-drain resistance (hereinafter referred to as the ON-state resistance) of each of the FETs in the conducting state can be reduced.

As a result, the gate-to-source capacitance (Cgs), the gate-to-drain capacitance (Cgd), and the RF voltage supplied to the ON-state resistance, each forming a factor causing the harmonic distortions, is reduced and, therefore, the harmonic distortions can be reduced.

As an improvement method for further reducing the harmonic distortions by adopting a multi-gate configuration, there has been a technology which uses a circuit provided with a line for supplying a potential at the midpoint between the two gates of a dual-gate FET (see Patent Document 2).

This allows the stabilization of an intermediate potential and thereby allows reductions in harmonic distortions.

In accordance with another improvement method for reducing the harmonic distortions by adopting the multi-gate configuration, an amount of potential lowering due to a leakage current is reduced by changing a line for supplying a potential at the midpoint between the two gates of a dual-gate FET, so that the harmonic distortions are improved successfully (see Patent Document 3).

In addition, there is also a typical SPDT switch based on the above-mentioned circuit technologies according to Patent Documents 1 to 3, in which a voltage booster circuit is provided for further reductions in distortions.

The voltage booster circuit is connected to each of the respective gates of FETs connected between a transmission circuit and an antenna. When any of the FETs is turned ON, the RF power from the FET is inputted to the voltage booster circuit. The voltage booster circuit generates a boosted voltage (about 4.5 V) higher than a control voltage (about 2 V) and applies the boosted voltage to the gate of the FET.

The boosted voltage is also applied to the drains (sources) of the other FETs each in the OFF state via the gate of the FET that has been turned ON. Since each of the gates of the FETs in the OFF state is at a reference potential VSS (0 V), the gate-to-source (–drain) voltage Vgs (Vgd) of each of these FETs becomes negative (to about –4.5 V).

As a result, each of the FETs is brought into a deeper OFF state so that the gate-to-source capacitance (Cgs) and the gate-to-drain capacitance (Cgd) are reduced. This allows reductions in harmonic distortions.

[Patent Document 1] Japanese Unexamined Patent Publication No. Hei 8(1996)-70245

[Patent Document 2] Japanese Patent Application No. 2004-353715

[Patent Document 3] Japanese Patent Application No. 2005-181669

SUMMARY OF THE INVENTION

However, it was found by the present inventors that the above-mentioned improvement technology for reducing the harmonic distortion in the SPDT switch had the following problems.

Indeed, the provision of the above-mentioned voltage booster circuit reduced the harmonic distortion.

In the GSM system described above, there is a data communication mode termed the EDGE (Enhanced Data rates for GSM Evolution) mode in addition to the voice communication. As shown in FIG. 14, each of the voice communication and the EDGE mode performs communication between a base station and a mobile terminal based on a "frame" which includes 8 communication units termed "slots" each spanning a given time (576.923 µs) at given intervals (Transmission: 34.2 µs, Reception: 30.46 µs). To develop diversified services, a communication mode termed DTM (Dual Transfer Mode), which uses the voice communication and the EDGE mode in one and the same frame, has been introduced in recent years and has caused a new problem.

That is, in the conventional transmission mode in the GSM system, the slots included in one frame of transmitted data are either for the voice communication or for the data communication. In the DTM mode, however, one frame includes both the slot for the voice communication and the slot for the data communication, as shown in FIG. 15. Data for the voice communication in the GSM system is phase modulated so that there is the possibility of producing a constantly large output (about 33 dBm) in the slot in one frame. In the EDGE mode as the data communication mode, on the other hand, amplitude modulation is performed in addition to phase modulation so that there is the possibility of producing a small output (about 5 dBm).

In the DTM mode described above, RF power changes on a per slot basis in one frame depending on the format (voice communication, data communication) of data. There are cases where the slot through which low power (about 5 dBm) passes comes immediately after the slot through which high power (about 33 dBm) passes.

FIG. 16 is a view showing a slot timing relative to power at the output terminal of a switch examined by the present inventors. In an ideal case, the 5 dBm low-power slot which comes after the 33 dBm slot presents a rectangular waveform. However, the output power does not promptly rise on the rising edge of the low-power slot after the high-power slot so that a delay occurs, indicated by the dotted line in the drawing. This leads to the problem that the harmonic distortions are enlarged to cause a loss in transmission power.

An object of the invention to provide a technology which prevents a rising delay resulting from the changing of slots in a SPDT switch and allows significant reductions in the harmonic distortions of the SPDT switch.

The above and other objects and novel features of the present invention will become apparent from the description of the present specification and the accompanying drawings.

A brief description will be given to the outline of the representative aspects of the invention disclosed in the present application.

A semiconductor integrated circuit device according to one aspect of the present invention comprises: a first terminal coupled to an antenna; a second terminal coupled to a signal processing circuit; a switching transistor disposed between the first and second terminals to switch a connection between the first and second terminals; a third terminal coupled to a control circuit for generating a control signal for the switching transistor; a voltage booster circuit which latches a transmission signal outputted via the switching transistor when the control signal is inputted via the third terminal, generates a boosted voltage higher than a voltage level of the control signal, and applies the boosted voltage to a control terminal of the switching transistor; and a resistor for a leak path connected between the first terminal and a reference potential to discharge charge capacitances accumulated in electrostatic capacitor elements as DC cut capacitors connected individually to the first to third terminals.

The semiconductor integrated circuit device according to another aspect of the present invention comprises: a first terminal coupled to an antenna; a first transmission terminal coupled to a first transmission circuit; a second transmission terminal coupled to a second transmission circuit; a reception terminal coupled to a reception circuit; a first switching transistor disposed between the first terminal and the first transmission terminal to switch a connection between the first terminal and the first transmission terminal; a second switching transistor disposed between the first terminal and the second transmission terminal to switch a connection between the first terminal and the second transmission terminal; a third switching transistor disposed between the first terminal and the reception terminal to switch a connection between the first terminal and the reception terminal; a third terminal coupled to a control circuit for generating a control signal for each of the first and second switching transistors; a voltage booster circuit which latches a transmission signal outputted via the first or second switching transistor when the control signal is inputted via the third terminal, generates a boosted voltage higher than a voltage level of the control signal, and applies the boosted voltage to a control terminal of the first or second switching transistor; and a resistor for a leak path connected between the second transmission terminal and a reference potential to discharge charge capacitances accumulated in electrostatic capacitor elements as DC cut capacitors connected individually to the first and third terminals, the first and second transmission terminals, and the reception terminal.

The semiconductor integrated circuit device according to still another aspect of the present invention comprises: a first terminal coupled to an antenna; a transmission terminal coupled to a transmission circuit; a plurality of reception terminals each coupled to a reception circuit; a transmission switching transistor disposed between the first terminal and the transmission terminal to switch a connection between the first terminal and the transmission terminal; a reception switching transistor disposed between the first terminal and each of the plurality of reception terminals to switch a connection between the first terminal and each of the plurality of reception terminals; a third terminal coupled to a control circuit for generating a control signal for the transmission switching transistor; a voltage booster circuit which latches a transmission signal outputted via the transmission switching transistor when the control signal is inputted via the third terminal, generates a boosted voltage higher than a voltage level of the control signal, and applies the boosted voltage to a control terminal of the transmission switching transistor; and a resistor for a leak path connected between any one of the plurality of reception terminals and a reference potential to discharge charge capacitances accumulated in electrostatic capacitor elements as DC cut capacitors connected individually to the first terminal, the transmission terminal, and the reception terminal.

The semiconductor integrated circuit device according to yet another aspect of the present invention comprises: a first terminal coupled to an antenna; a first transmission terminal coupled to a first transmission circuit; a second transmission terminal coupled to a second transmission circuit; a reception terminal coupled to a reception circuit; a first switching transistor disposed between the first terminal and the first transmission terminal to switch a connection between the first terminal and the first transmission terminal; a second switching transistor disposed between the first terminal and the second transmission terminal to switch a connection between the first terminal and the second transmission terminal; a third switching transistor disposed between the first terminal and the reception terminal to switch a connection between the first terminal and the reception terminal; a third terminal coupled to a control circuit for generating a control signal for each of the first and second switching transistors; a voltage booster circuit which latches a transmission signal outputted via the first or second switching transistor when the control signal is inputted via the third terminal, generates a boosted voltage higher than a voltage level of the control signal, and applies the boosted voltage to a control terminal of the first or second switching transistor; and a resistor for a leak path connected between the first transmission terminal and a reference potential to discharge charge capacitances accumulated in electrostatic capacitor elements as DC cut capacitors connected individually to the first and third terminals, the first and second transmission terminals, and the reception terminal.

In the semiconductor integrated circuit device according to the present invention, a GSM transmission signal inputted to the first transmission circuit is inputted to the first transmission terminal and a PCS transmission signal inputted to the second transmission circuit is inputted to the second transmission terminal.

The semiconductor integrated circuit device according to still another aspect of the present invention comprises:

a first terminal coupled to an antenna; a transmission terminal coupled to a transmission circuit; a plurality of reception terminals each coupled to a reception circuit; a transmission switching transistor disposed between the first terminal and the transmission terminal to switch a connection between the first terminal and the transmission terminal; a first reception switching transistor connected to the first terminal to switch a connection of the first terminal; a second reception switching transistor connected between the first reception switching transistor and each of the plurality of reception terminals to switch a connection of each of the plurality of reception terminals; a third terminal coupled to a control circuit for generating a control signal for the transmission switching transistor; a voltage booster circuit which latches a transmission signal outputted via the transmission switching transistor when the control signal is inputted via the third terminal, generates a boosted voltage higher than a voltage level of the control signal, and applies the boosted voltage to a control terminal of the transmission switching transistor; and a resistor for a leak path connected between a reference potential and a connecting portion between the first reception switching transistor and any of the plurality of second reception switching transistors to discharge charge capacitances accumulated in electrostatic capacitor elements as DC cut capacitors connected individually to the first terminal, the transmission terminal, and the plurality of reception terminals.

In the semiconductor integrated circuit device according to the present invention, a resistance value of the resistor for a leak path is not less than 100 KΩ.

A brief description will also be given to the outline of the other aspects of the invention disclosed in the present application.

A high frequency power amplifier module according to one aspect of the present invention comprises: an antenna connection switching circuit; and a high frequency power amplifier which receives a transmission signal from a transmission circuit, amplifies the transmission signal, and supplies the amplified transmission signal to the antenna connection switching circuit, wherein the antenna connection switching circuit comprises: a first terminal coupled to an antenna; a transmission terminal coupled to the high frequency power amplifier; a reception terminal coupled to a reception circuit; a switching transistor disposed between the first terminal and the transmission terminal to switch a connection between the first terminal and the transmission terminal; a third terminal coupled to a control circuit for generating a control signal for the switching transistor; a voltage booster circuit which latches the transmission signal outputted via the switching transistor when the control signal is inputted via the third terminal, generates a boosted voltage higher than a voltage level of the control signal, and applies the boosted voltage to a control terminal of the first switching transistor; and a resistor for a leak path connected between the first terminal and a reference potential to discharge charge capacitances accumulated in electrostatic capacitor elements as DC cut capacitors connected individually to the first to third terminals.

The high frequency power amplifier module according to another aspect of the present invention comprises: an antenna connection switching circuit; and high frequency power amplifiers which receive respective transmission signals from first and second transmission circuits, amplify the transmission signals, and supply the amplified transmission signals to the antenna connection switching circuit, wherein the antenna connection switching circuit comprises: a first terminal coupled to an antenna; first and second transmission terminals coupled to the high frequency power amplifiers; a reception terminal coupled to a reception circuit; a first switching transistor disposed between the first terminal and the first transmission terminal to switch a connection between the first terminal and the first transmission terminal; a second switching transistor disposed between the first terminal and the second transmission terminal to switch a connection between the first terminal and the second transmission terminal; a third switching transistor disposed between the first terminal and the reception terminal to switch a connection between the first terminal and the reception terminal; a third terminal coupled to a control circuit for generating a control signal for each of the first and second switching transistors; a voltage booster circuit which latches the transmission signal outputted via the first or second switching transistor when the control signal is inputted via the third terminal, generates a boosted voltage higher than a voltage level of the control signal, and applies the boosted voltage to a control terminal of the first or second switching transistor; and a resistor for a leak path connected between the second transmission terminal and a reference potential to discharge charge capacitances accumulated in electrostatic capacitor elements as DC cut capacitors connected individually to the first and third terminals, the first and second transmission terminals, and the reception terminal.

The high frequency power amplifier module according to still another aspect of the present invention comprises: an antenna connection switching circuit; and a high frequency power amplifier which receives a transmission signal from each of first and second transmission circuits, amplifies the transmission signal, and supplies the amplified transmission signal to the antenna connection switching circuit, wherein the antenna connection switching circuit comprises: a first terminal coupled to an antenna; a transmission terminal coupled to the high frequency power amplifier; a plurality of reception terminals each coupled to a reception circuit; a transmission switching transistor disposed between the first terminal and the transmission terminal to switch a connection between the first terminal and the transmission terminal; a reception switching transistor disposed between the first terminal and each of the plurality of reception terminals to switch a connection between the first terminal and each of the reception terminals; a third terminal coupled to a control circuit for generating a control signal for the transmission switching transistor; a voltage booster circuit which latches the transmission signal outputted via the transmission switching transistor when the control signal is inputted via the third terminal, generates a boosted voltage higher than a voltage level of the control signal, and applies the boosted voltage to a control terminal of the transmission switching transistor; and a resistor for a leak path connected between any one of the plurality of reception terminals and a reference potential to discharge charge capacitances accumulated in electrostatic capacitor elements as DC cut capacitors connected individually to the first terminal, the transmission terminal, and the reception terminal.

The high frequency power amplifier module according to yet another aspect of the present invention comprises: an antenna connection switching circuit; and high frequency power amplifiers which receive respective transmission signals from first and second transmission circuits, amplify the transmission signals, and supply the amplified transmission signals to the antenna connection switching circuit, wherein the antenna connection switching circuit comprises: a first terminal coupled to an antenna; first and second transmission terminals coupled to the high frequency power amplifiers; a reception terminal coupled to a reception circuit; a first switching transistor disposed between the first terminal and the first transmission terminal to switch a connection between the first terminal and the first transmission terminal; a second switching transistor disposed between the first terminal and the second transmission terminal to switch a connection between the first terminal and the second transmission terminal; a third switching transistor disposed between the first terminal and the reception terminal to switch a connection between the first terminal and the reception terminal; a third terminal coupled to a control circuit for generating a control signal for each of the first and second switching transistors; a voltage booster circuit which latches the transmission signal outputted via the first or second switching transistor when the control signal is inputted via the third terminal, generates a boosted voltage higher than a voltage level of the control signal, and applies the boosted voltage to a control terminal of the first or second switching transistor; and a resistor for a leak path connected between the first transmission terminal and a reference potential to discharge charge capacitances accumulated in electrostatic capacitor elements as DC cut capacitors connected individually to the first and third terminals, the first and second transmission terminals, and the reception terminal.

In the high frequency power amplifier module according to the present invention, the high frequency power amplifier connected to the first transmission terminal outputs a GSM transmission signal and the high frequency power amplifier connected to the second transmission terminal outputs a PCS transmission signal.

The high frequency power amplifier module according to still another aspect of the present invention comprises: an antenna connection switching circuit; and a high frequency power amplifier which receives a transmission signal from each of first and second transmission circuits, amplifies the transmission signal, and supplies the amplified transmission signal to the antenna connection switching circuit, wherein the antenna connection switching circuit comprises: a first terminal coupled to an antenna; a transmission terminal coupled to the high frequency power amplifier; a plurality of reception terminals each coupled to a reception circuit; a transmission switching transistor disposed between the first terminal and the transmission terminal to switch a connection between the first terminal and the transmission terminal; a first reception switching transistor connected to the first terminal to switch a connection of the first terminal; a plurality of second reception switching transistors connected between the first reception switching transistor and each of the plurality of respective reception terminals to switch a connection of each of the plurality of reception terminals; a third terminal coupled to a control circuit for generating a control signal for the transmission switching transistor; a voltage booster circuit which latches the transmission signal outputted via the transmission switching transistor when the control signal is inputted via the third terminal, generates a boosted voltage higher than a voltage level of the control signal, and applies the boosted voltage to a control terminal of the transmission switching transistor; and a resistor for a leak path connected between a reference potential and a connecting portion between the first reception switching transistor and any of the plurality of second reception switching transistors to discharge charge capacitances accumulated in electrostatic capacitor elements as DC cut capacitors connected to the first terminal, the transmission terminal, and the plurality of reception terminals.

In the high frequency power amplifier module according to the present invention, a resistance value of the resistor for a leak path is not less than 100 KΩ.

The following is the brief description of effects achievable by the representative aspects of the invention disclosed in the present application.

(1) A delay in the rising of an output power can be prevented, while the characteristic of harmonic distortion of an antenna connection switching circuit is improved.

(2) By constructing a high frequency power amplifier module by using the antenna connection switching circuit mentioned above in the effect (1), the reliability of an electronic system such as communication equipment can be improved.

BRIEF DESCRIPTION OF THE DRAWINGS

FIG. 7 is an illustrative view showing the result of simulation for analyzing the deterioration of an insertion loss caused by connecting the resistor for leak path;

FIG. 8 is an illustrative view showing amounts of variations in harmonic distortions when a SPDT switch provided with no resistor for leak path is used as a reference;

DESCRIPTION OF THE PREFERRED EMBODIMENTS

Figure 1:
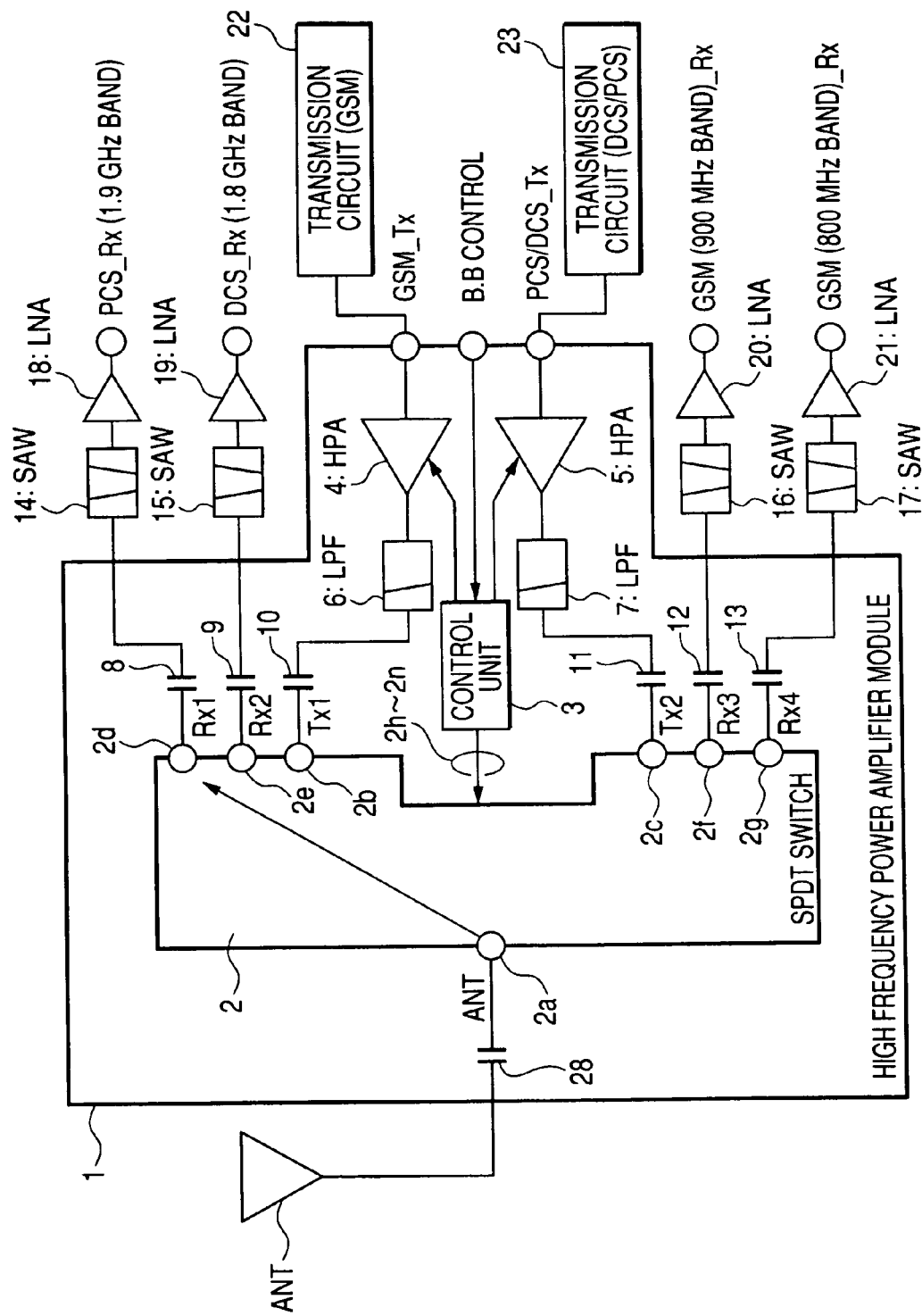
FIG. 1 is a block diagram of a high frequency power amplifier module according to an embodiment of the present invention.

Referring now to the drawings, the embodiments of the present invention will be described herein below in detail. Throughout the drawings for illustrating the embodiments, like parts are designated by like reference numerals in principle and the repeated description thereof will be omitted.

Figure 2:
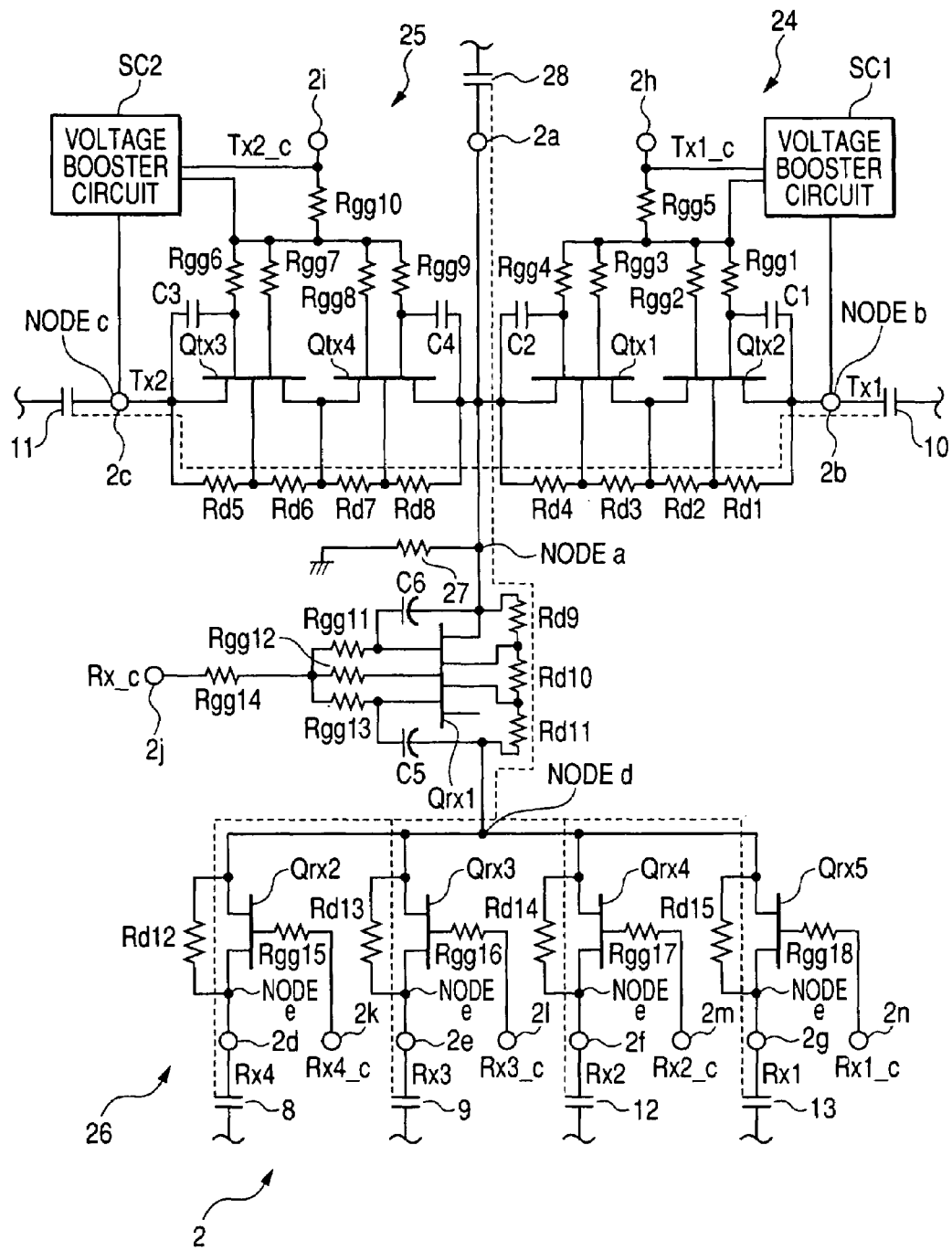
FIG. 2 is a circuit diagram of a SPDT switch provided in the high frequency power amplifier module of FIG. 1.
Figure 3:
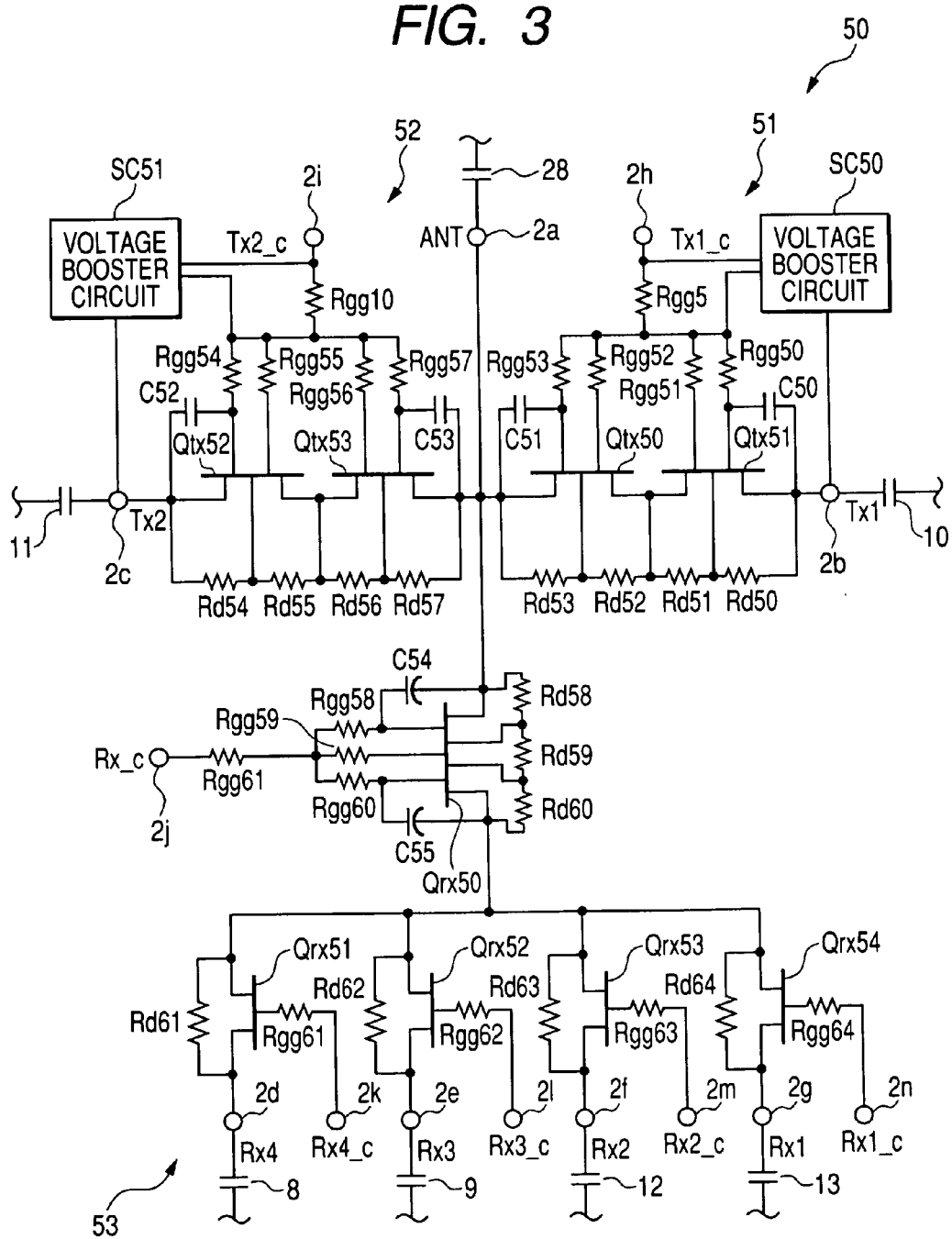
FIG. 3 is a circuit diagram showing an example of a structure of a SPDT switch examined by the present inventors.
Figure 4A:
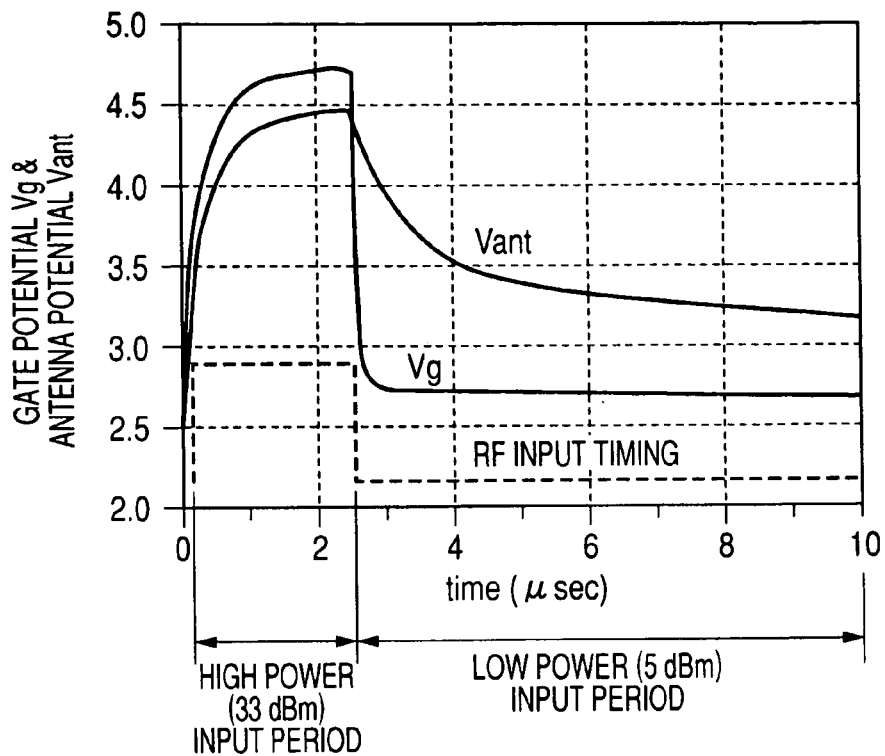
FIGS. 4A and 4B are illustrative views each showing an example of the result of simulation exhibiting a response characteristic in the SPDT switch of FIG. 3.
Figure 4B:
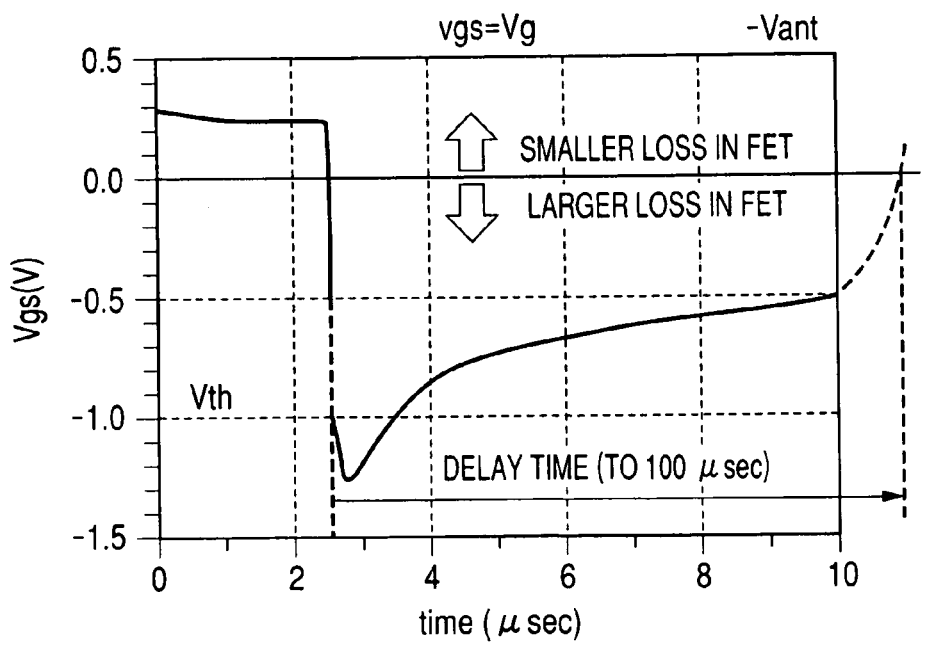
Figure 5A:
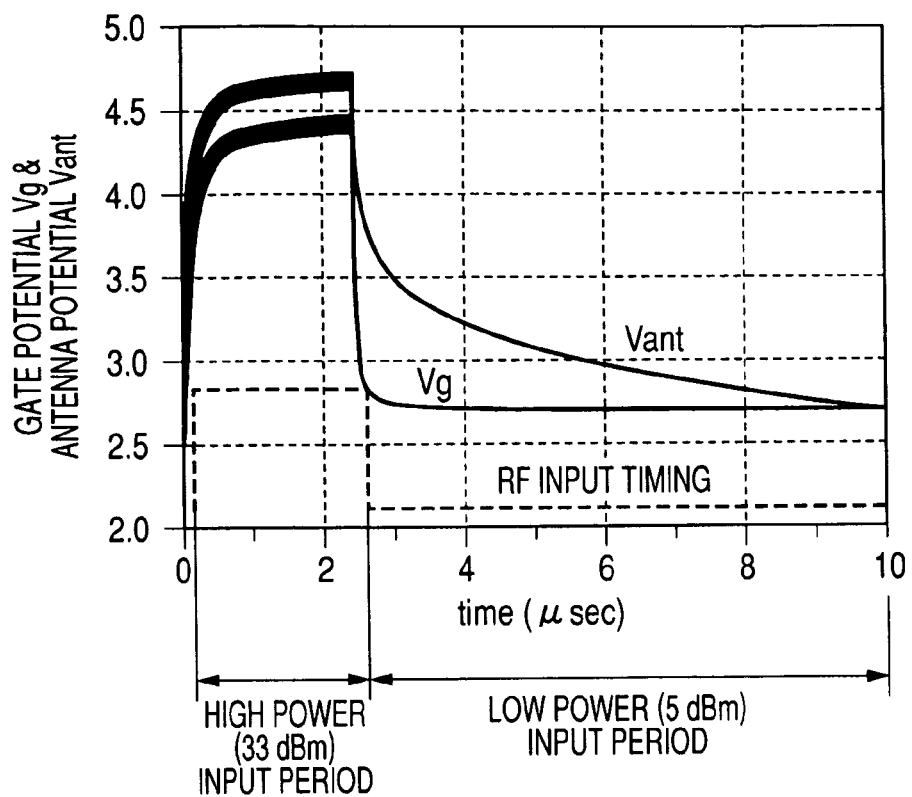
FIGS. 5A and 5B are illustrative views each showing the result of simulating time-lapse variations in gate potential Vg and drain potential Vant in the SPDT switch of FIG. 2.
Figure 5B:
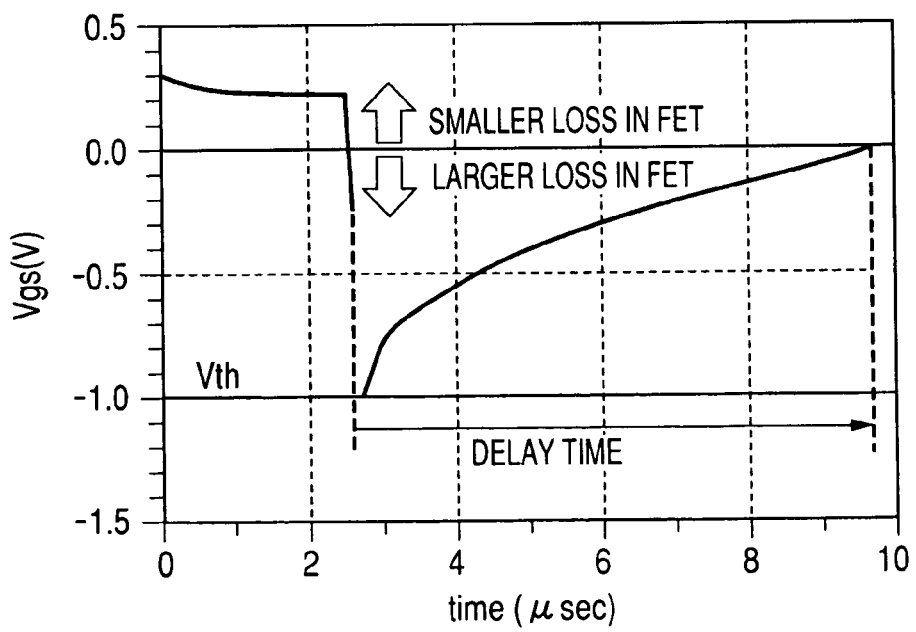
Figure 6:
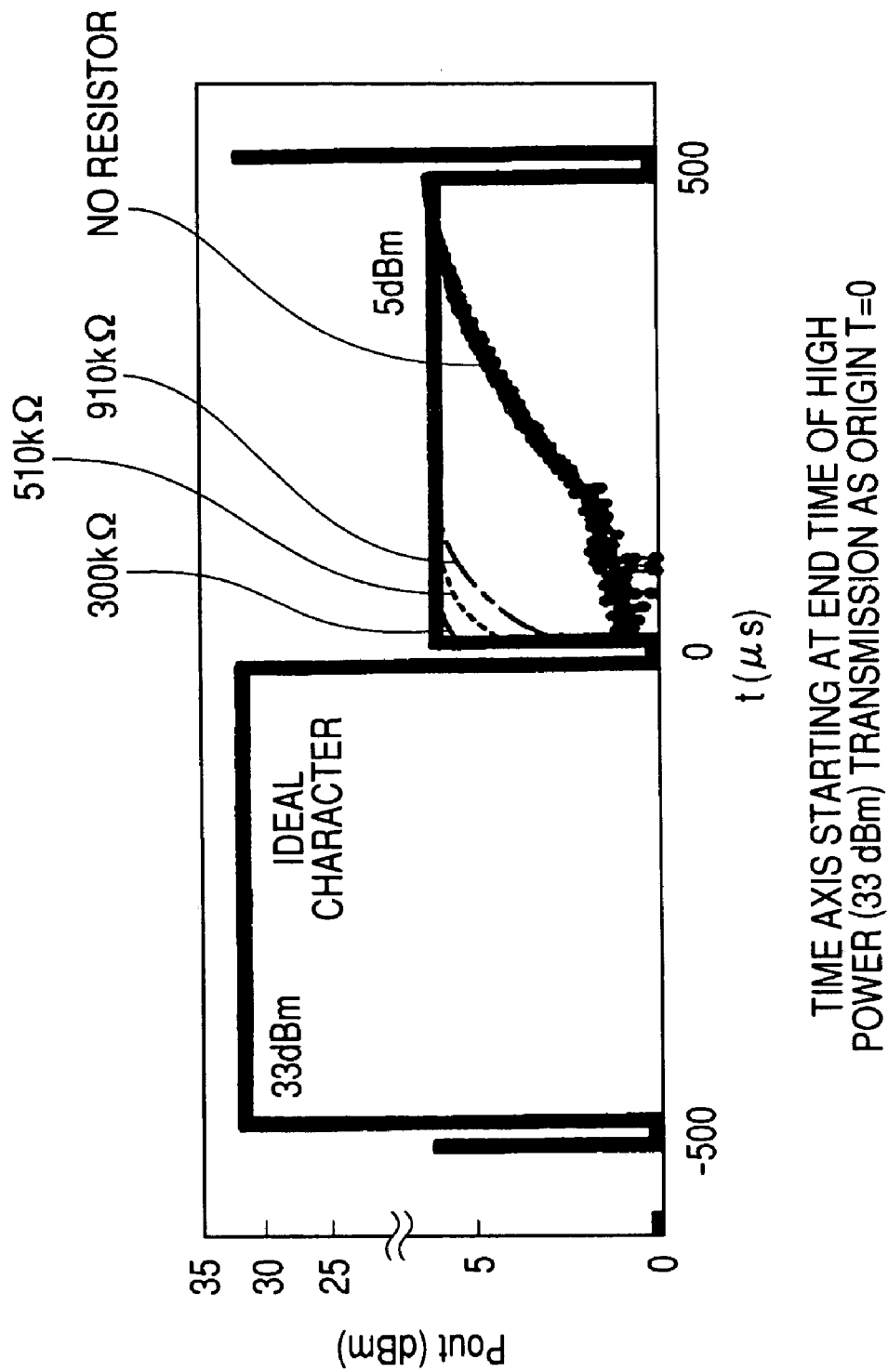
FIG. 6 is an illustrative view showing the result of actually measuring the dependence of a delay time in the rising of an output power on a resistor for leak path in an SPDT switch.
Figure 9:
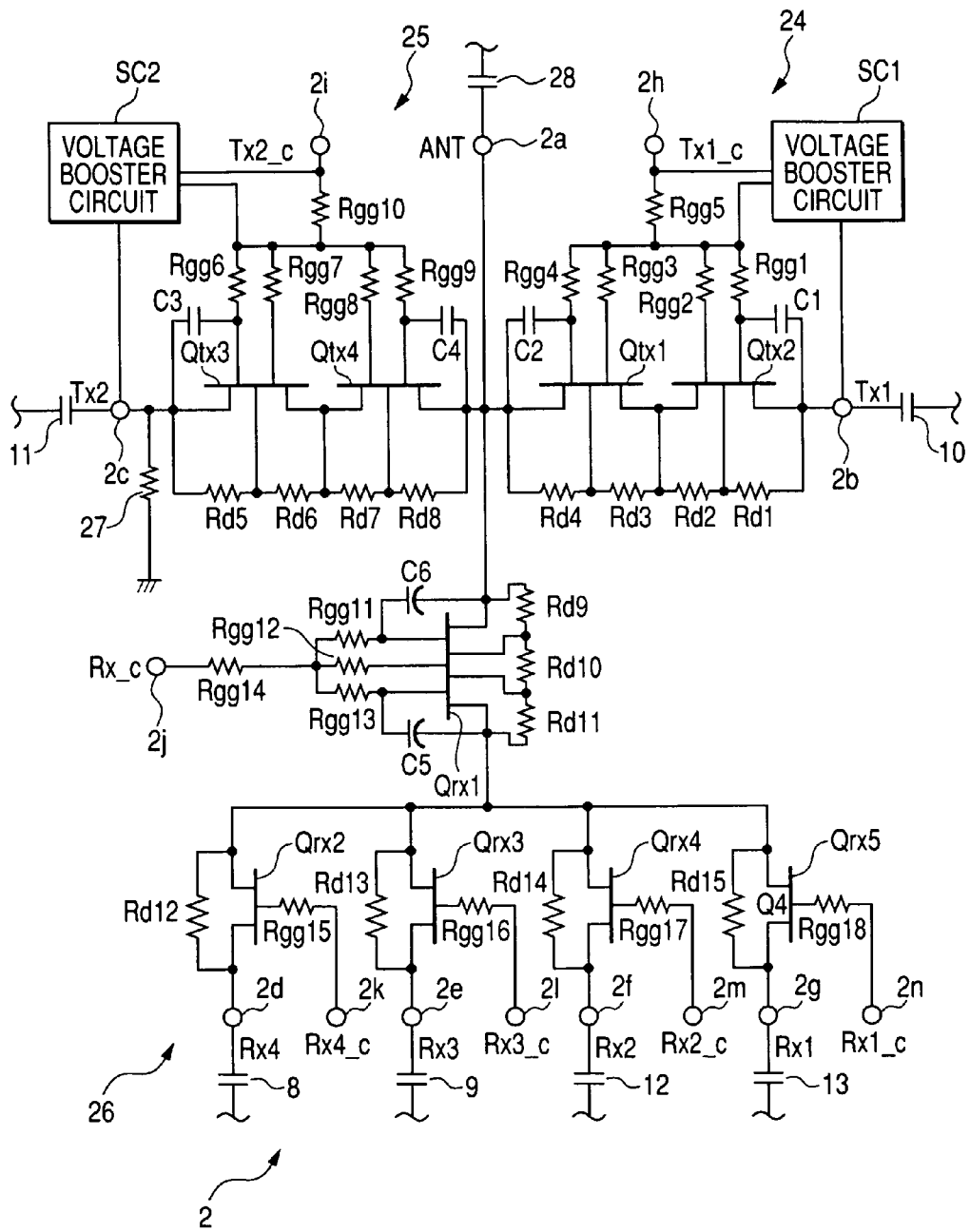
FIG. 9 is a circuit diagram showing another example of the structure of the SPDT switch of FIG. 2.
Figure 10:
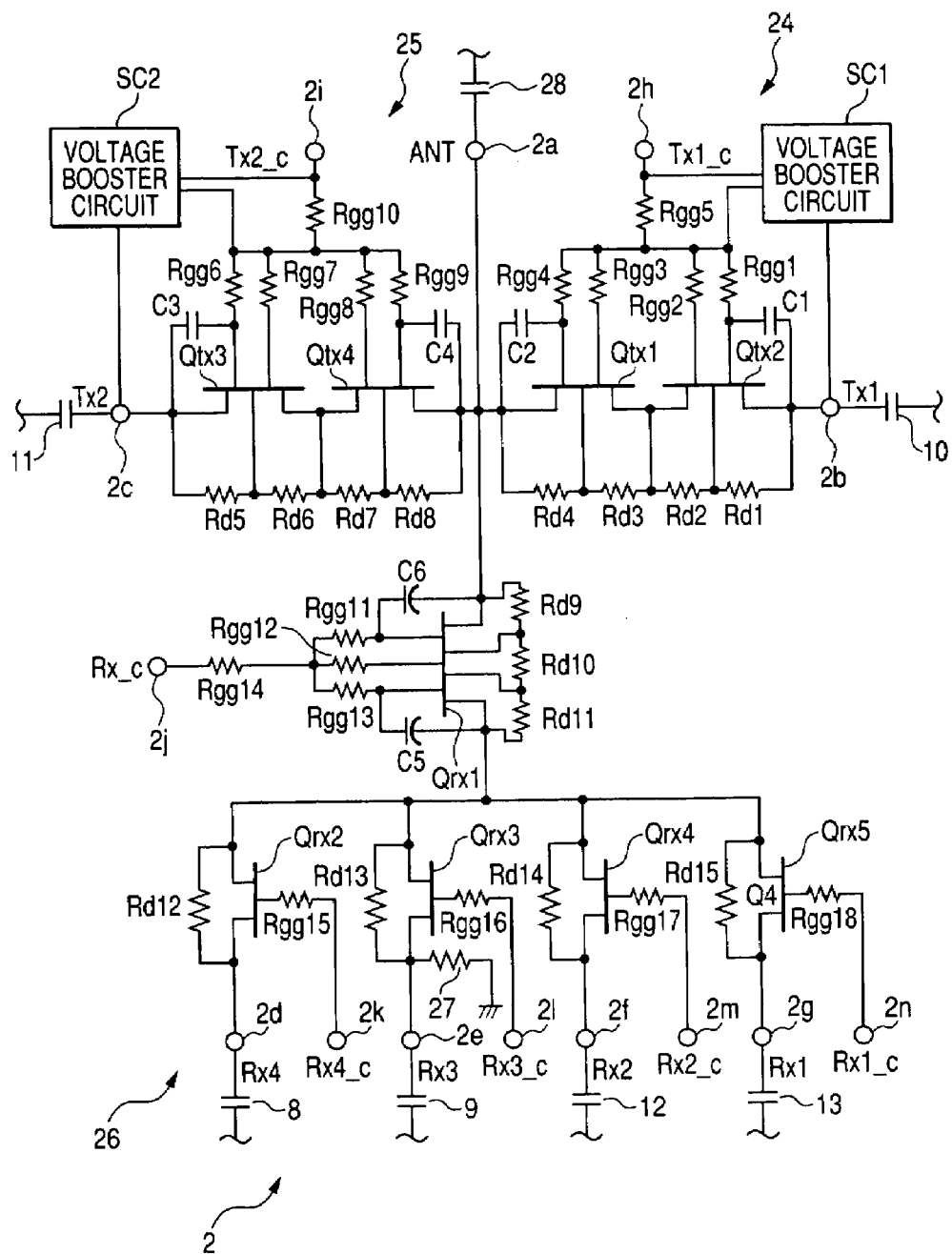
FIG. 10 is a circuit diagram showing another example of the structure of the SPDT switch of FIG. 9.
Figure 11:
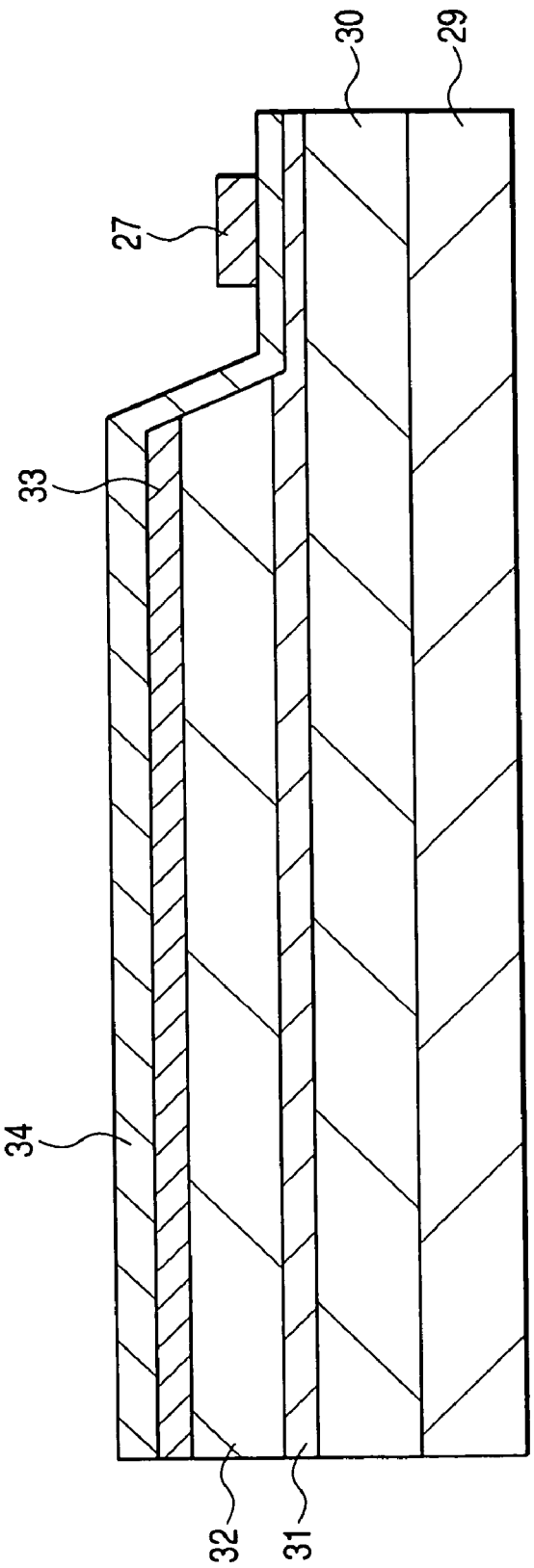
FIG. 11 is a cross-sectional view showing a process flow in the resistor for leak path of FIG. 2.
Figure 12:
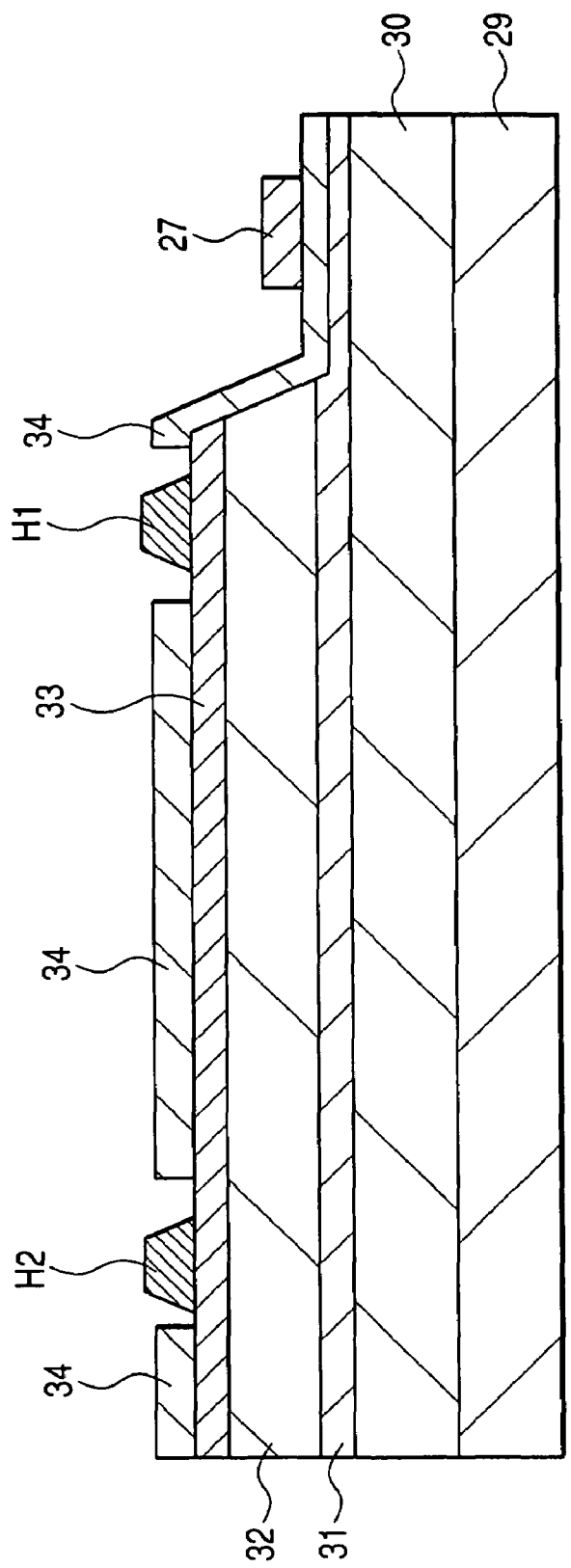
FIG. 12 is a cross-sectional view showing the process flow subsequent to FIG. 11.
Figure 13:
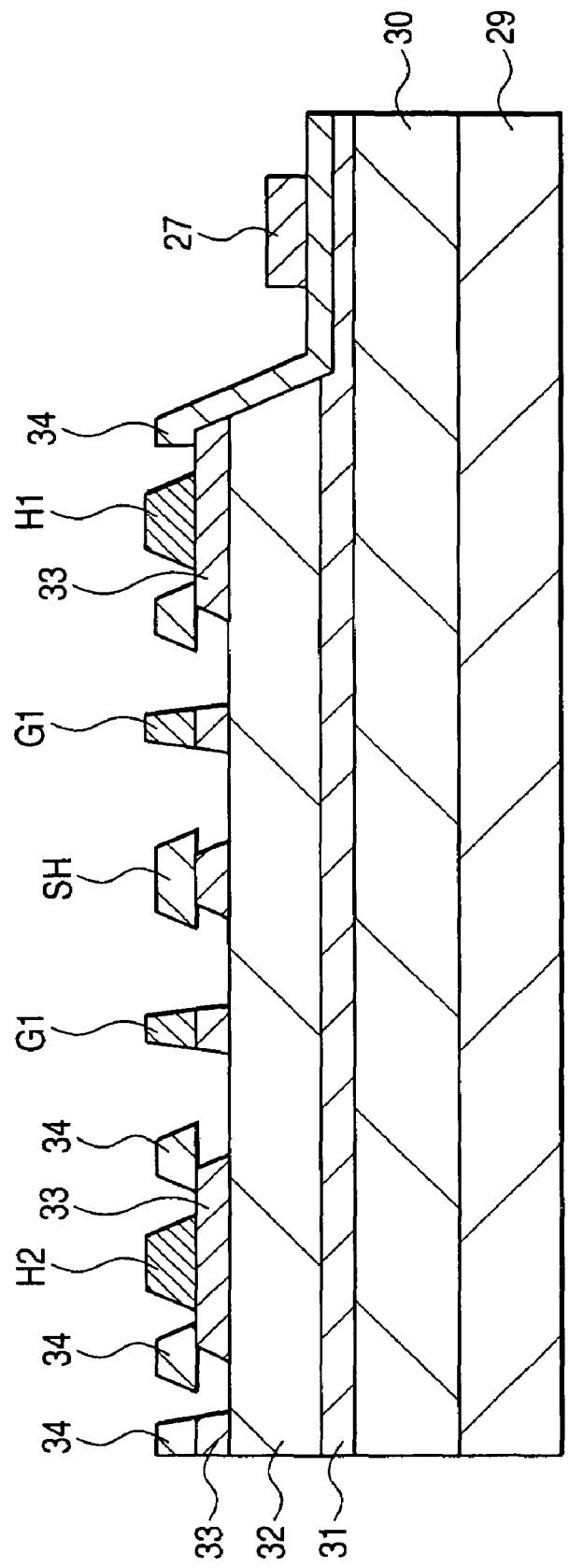
FIG. 13 is a cross-sectional view showing the process flow subsequent to FIG. 12.
Figure 14:
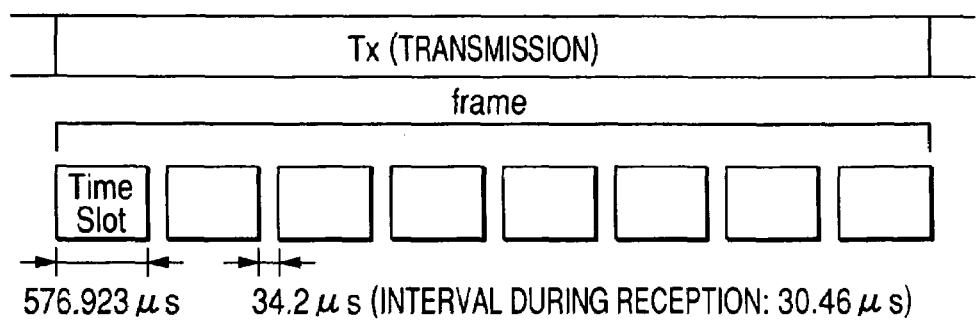
FIG. 14 is a timing chart showing an example of a management timing for received data in a GSM/EDGE mode.
Figure 15:
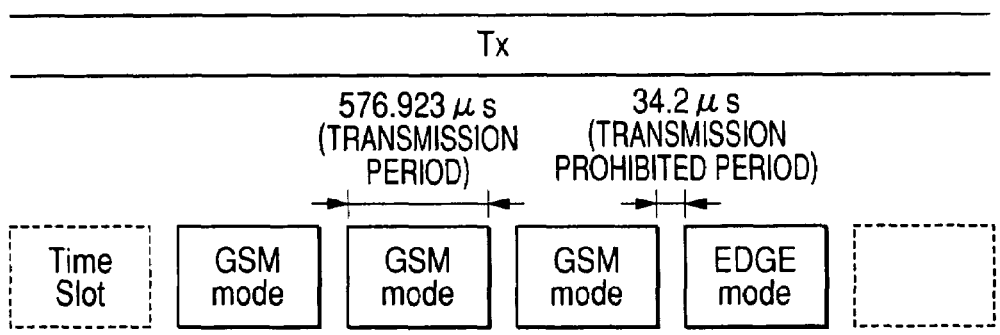
FIG. 15 is a timing chart showing an example of a management timing for received data in the GSM/EDGE mode using the DTM.

FIG. 1 is a block diagram of a high frequency power amplifier module according to an embodiment of the present invention. FIG. 2 is a circuit diagram of a SPDT switch provided in the high frequency power amplifier module of FIG. 1. FIG. 3 is a circuit diagram showing an example of a structure of a SPDT switch examined by the present inventors. FIGS. 4A and 4B are illustrative views each showing an example of the result of simulation exhibiting a response characteristic in the SPDT switch of FIG. 3. FIGS. 5A and 5B are illustrative views each showing the result of simulating time-lapse variations in gate potential Vg and drain potential Vant in the SPDT switch of FIG. 2. FIG. 6 is an illustrative view showing the result of actually measuring the dependence of a delay time in the rising of an output power on a resistor for leak path in an SPDT switch. FIG. 7 is an illustrative view showing the result of simulation for analyzing the deterioration of an insertion loss caused by connecting the resistor for leak path. FIG. 8 is an illustrative view showing amounts of variations in harmonic distortions when a SPDT switch provided with no resistor for leak path is used as a reference. FIG. 9 is a circuit diagram showing another example of the structure of the SPDT switch of FIG. 2. FIG. 10 is a circuit diagram showing another example of the structure of the SPDT switch of FIG. 9. FIGS. 11 to 13 are cross-sectional views showing a process flow in a resistor 27 for leak path.

In the present embodiment, a high frequency power amplifier module 1 is, e.g., a power amplifier module for transmission via mobile phone as a communication system. The high frequency power amplifier module 1 is comprised of: a SPDT switch (antenna connection switching circuit) 2; a control unit 3; high frequency power amplifiers (High Power Amps) 4 and 5; low pass filters 6 and 7; and electrostatic capacitor elements 8 to 13 and 28, as shown in FIG. 1.

The SPDT switch 2 switches between transmitted/received signals based on the control of the control unit 3. The SPDT switch 2 comprises: a terminal 2a for antenna; transmission signal terminals 2b and 2c; reception signal terminals 2d to 2g; and control terminals 2h to 2n.

The electrostatic capacitor elements 8 to 13 and 28 have respective one connecting portions connected individually to the transmission signal terminals 2b and 2c, the reception signal terminals 2d to 2g, and the terminal 2a for antenna. The low pass filters 6 and 7 are connected to the respective other connecting portions of the electrostatic capacitor elements 10 and 11.

SAWs (Surface Acoustic Waves) 14 to 17 provided in a reception system circuit are connected to the respective other connecting portions of the electrostatic capacitor elements 8, 9, 12, and 13. An antenna ANT is connected to the other connecting portion of the electrostatic capacitor element 28.

The electrostatic capacitor elements 8 to 13 and 28 are provided as DC cut capacitors. Each of the SAWs 14 to 17 selects a propagated signal at a specified frequency as an RF signal by using an elastic surface wave on a piezoelectric material.

In the respective stages subsequent to the SAWs 14 to 17, LNAs (Low Noise Amps) 18 to 21 as low noise amplifiers are connected. The LNAs 18 and 21 amplify reception signals in the individual frequency bands of the PCS/DSC (1800 MHz/1900 MHz) and the GSM (800 MHz, 900 MHz).

The control unit 3 controls the operation of the SPDT switch 2 in accordance with a control signal outputted from a baseband circuit. The high frequency power amplifier 4 amplifies transmission signals in the GSM frequency bands supplied from a transmission circuit 22. The high frequency power amplifier 5 amplifies transmission signals in the DCS/PCS frequency bands supplied from a transmission circuit 23. The low pass filters 6 and 7 pass the respective transmission frequencies of transmission signals individually outputted from the high frequency power amplifiers 4 and 5.

FIG. 2 is a circuit diagram showing the SPDT switch 2 as the first embodiment of the present invention.

As shown in the drawing, the SPDT switch 2 is composed of: transmission signal switching elements 24 and 25; a reception signal switching element 26; and the resistor 27 for leak path.

The transmission signal switching element 24 is composed of: transistors (switching transistors switching) Qtx1 and Qtx2; resistors Rgg1 to Rgg5; resistors Rd1 to Rd4; electrostatic capacitor elements C1 and C2; and a voltage booster circuit SC1.

The transmission signal switching element 25 is composed of: transistors (switching transistors) Qtx3 and Qtx4; resistors Rgg6 to Rgg10; resistors Rd5 to Rd8; electrostatic capacitor elements C3 and C4; and a voltage booster circuit SC2.

The reception signal switching element 26 is composed of: transistors (switching transistors) Qrx1 to Qrx5; resistors Rgg11 to Rgg18; resistors Rd9 to Rd15; and electrostatic capacitor elements C5 and C6.

These transistors Qtx1, Qtx2, Qtx3, Qtx4, and Qrx1 to Qrx5 are composed of, e.g., FETs. Each of the transistors Qtx1 to Qtx4 is composed of a dual-gate FET provided with two gates. The transistor (switching transistor) Qrx1 is composed of a multi-gate FET provided with three gates.

The terminal 2a for antenna is connected to one connecting portion of each of the transistors Qtx1, Qtx4, and Qrx1, to one connecting portion of each of the electrostatic capacitor elements C2, C4, and C6, and to one connecting portion of the resistors Rd4, Rd8, and Rd9.

The resistor 27 for leak path has one connecting portion connected to the terminal 2a for antenna, while having the other connecting portion connected to a reference potential VSS. The resistor 27 for leak path is a resistor for discharging which discharges charge capacitances accumulated in the electrostatic capacitor elements 8 to 13 and 28 provided as the DC cut capacitors connected individually to the transmission signal terminals 2b and 2c and the reception signal terminals 2d to 2g.

The control terminal 2h is connected to one connecting portion of the resistor Rgg5, while one connecting portion of each of the resistors Rgg1 to Rgg4 is connected to the other connecting portion of the resistor Rgg5.

One of the gates of the transistor Qtx1 and the other connecting portion of the electrostatic capacitor element C2 are connected to the other connecting portion of the resistor Rgg4. The other gate of the transistor Qtx1 is connected to the other connecting portion of the resistor Rgg3.

The voltage booster circuit SC1 latches a transmission signal (in the GSM band) from the transmission signal terminal 2b when the control signal is inputted to the transistors Qtx1 and Qtx2 via the control terminal 2h, generates a boosted voltage higher than the voltage level of the control signal, and applies the boosted voltage to the gates of the transistors Qtx1 and Qtx2.

One gate of the transistor Qtx2 and one connecting portion of the electrostatic capacitor element C1 are connected to the other connecting portion of the resistor Rgg1. The other gate of the transistor Qtx2 is connected to the other connecting portion of the resistor Rgg2.

One connecting portion of the transistor Qtx2 is connected to the other connecting portion of the transistor Qtx1. The transmission signal terminal 2b is connected to the other connecting portion of the transistor Qtx2 and to the other connecting portion of the electrostatic capacitor element C1.

The resistors Rd1 to Rd4 are connected in series between one connecting portion of the transistor Qtx1 and the other connecting portion of the transistor Qtx2. The connecting portion between the resistors Rd1 and Rd2 is connected between the two gates of the transistor Qtx2. The connecting portion between the resistors Rd3 and Rd4 is connected between the two gates of the transistor Qtx1. The connecting portion between the transistors Qtx1 and Qtx2 is connected to the connecting portion between the resistors Rd2 and Rd3.

Each of the resistors Rd1 to Rd4 is used as a resistor for supplying the gate-to-gate potential of the transistor Qtx1.

The control terminal 2i is connected to one connecting portion of the resistor Rgg10, while one connecting portion of each of the resistors Rgg6 to Rgg9 is connected to the other connecting portion of the resistor Rgg10.

One of the gates of the transistor Qtx3 and the other connecting portion of the electrostatic capacitor element C3 are connected to the other connecting portion of the resistor Rgg6. The other gate of the transistor Qtx3 is connected to the other connecting portion of the resistor Rgg7.

One of the gates of the transistor Qtx4 and the other connecting portion of the electrostatic capacitor element C4 are connected to the other connecting portion of the resistor Rgg9. The other gate of the transistor Qtx4 is connected to the other connecting portion of the resistor Rgg8.

One connecting portion of the transistor Qtx4 is connected to the other connecting portion of the transistor Qtx3. The transmission signal terminal 2c is connected to one connecting portion of the transistor Qtx3 and to the other connecting portion of the electrostatic capacitor element C3.

The resistors Rd5 to Rd8 are connected in series between one connecting portion of the transistor Qtx3 and the other connecting portion of the transistor Qtx4. The connecting portion between the resistors Rd5 and Rd6 is connected between the two gates of the transistor Qtx3. The connecting portion between the resistors Rd7 and Rd8 is connected between the two gates of the transistor Qtx4. The connecting portion between the transistors Qtx3 and Qtx4 is connected to the connecting portion between the resistors Rd6 and Rd7.

Each of the resistors Rd5 to Rd8 is used as a resistor for supplying the gate-to-gate potential of the transistor Qtx2.

The control terminal 2i is connected to one connecting portion of the resistor Rgg10. One connecting portion of each of the resistors Rgg6 to Rgg9 is connected to the other connecting portion of the resistor Rgg10.

The voltage booster circuit SC2 latches a transmission signal (in the DSC/PCS band) from the transmission signal terminal 2c when the control signal is inputted to the transistors Qtx3 and Qtx4 via the control terminal 2i, generates a boosted voltage higher than the voltage level of the control signal, and applies the boosted voltage to the gates of the transistors Qtx1 and Qtx2.

The control terminal 2j is connected to one connecting portion of the resistor Rgg14. One connecting portion of each of the resistors Rgg11 to Rgg13 is connected to the other connecting portion of the resistor Rgg14.

The three gates of the transistor Qrx1 are connected to the respective other connecting portions of the resistors Rgg11 to Rgg13. The other connecting portion of the electrostatic capacitor element C6 is connected to the other connecting portion of the resistor Rgg11. The other connecting portion of the electrostatic capacitor element C5 is connected to the other connecting portion of the resistor Rgg13.

The resistors Rd9 to Rd11 are connected in series between one connecting portion of the transistor Qrx1 and the other connecting portion thereof. The connecting portion between the resistors Rd9 and Rd10 is connected between the first and second gates of the transistor Qrx1.

The connecting portion between the resistors Rd10 and Rd11 is connected between the second and third gates of the transistor Qrx1. The other connecting portion of the transistor Qrx1, one connecting portion of each of the transistors Qrx2 to Qrx5, and one connecting portion of each of the resistors Rd12 to Rd15 is connected to one connecting portion of the electrostatic capacitor element C5.

The reception signal terminal 2d is connected to each of the other connecting portions of the transistor Qrx2 and the resistor Rd12. The reception signal terminal 2e is connected to each of the other connecting portions of the transistor Qrx3 and the resistor Rd13.

The reception signal terminal 2f is connected to each of the other connecting portions of the transistor Qrx4 and the resistor Rd14. The reception signal terminal 2g is connected to each of the other connecting portions of the transistor Qrx5 and the resistor Rd15.

The respective one connecting portions of the resistors Rgg15 to Rgg18 are connected individually to the gates of the transistors Qrx2 to Qrx5. The control terminals 2k to 2n are connected to the respective other connecting portions of the resistors Rgg15 to Rgg18.

The resistors Rgg1 to Rgg13 are resistors for supplying respective control signals for the transistors Qtx1 to Qtx4 and Qrx1. The electrostatic capacitor elements C1 to C6 are used as capacitor elements for power endurance for the transistors Qtx1 to Qtx4 and Qrx1.

For a comparison with the SPDT switch 2 according to the present invention, the SPDT switch 50 examined by the present inventors will be described.

FIG. 3 is a circuit diagram showing an example of a conventional structure of the SPDT switch 50 examined by the present inventors.

As shown in the drawing, the SPDT switch 50 is comprised of: transmission signal switching elements 51 and 52; and a reception signal switching element 53. The transmission signal switching element 51 is composed of: transistors Qtx50 and Qtx51; resistors Rgg50 to Rgg53; resistors Rd50 to Rd53; electrostatic capacitor elements C50 and C51; and a voltage booster circuit SC50.

The transmission signal switching element 52 is composed of: transistors Qtx52 and Qtx53; resistors Rgg54 to Rgg57; resistors Rd54 to Rd57; electrostatic capacitor elements C52 and C53; and a voltage booster circuit SC51.

The reception signal switching element 53 is composed of: transistors Qrx50 to Qrx54; resistors Rgg58 to Rgg64; resistors Rd58 to Rd64; and electrostatic capacitor elements C54 and C55.

Since the SPDT switch 50 has the same connection configuration as the SPDT switch 2 except that the resistor 27 for leakage (FIG. 2) is not provided, the detailed description thereof will be omitted.

By using FIG. 3, a simulation will be performed on time-lapse variations in the gate potential Vg and drain potential (potential at the antenna terminal) Vant of each of the transistors Qtx52 and Qtx53 when the input potential, which is currently high power (about 33 dBm) inputted from the transmission signal terminal 2c, is changed to lower power. It is assumed that, when the input potential is changed, each of the transistors Atx52 and Qtx53 is in the ON state (about 2.8 V is applied to the control terminal 2i and the other control terminals 2h and 2j to 2n are at 0 V (reference potential Vss)). Based on the result of the simulation, time-lapse variations in the voltages impressed on the transistors will be analyzed and an increase in the loss of each of the ON-state transistors will be examined.

FIGS. 4A and 4B show an example of the result of the simulation exhibiting the response characteristic of the SPDT switch 50 of FIG. 3. The resistance value of the resistor 27 for leak path is assumed to be 300 KΩ.

FIG. 4A shows the transient response characteristic of gate potential Vg vs. drain (antenna terminal) potential Vant in each of the transistors Qtx52 and Qtx53.

The drawings show time-lapse variations in the gate potential Vg and drain (source) potential Vant of each of the transistors Qtx52 and Qtx53 when the input power is changed from the high power of about 33 dBm to the low power of about dBm at the time 2.5 μsec.

During the period in which the high power was inputted (0 to 2.5 μsec), the voltage boosted by the voltage booster circuit SC51 is applied to the gate of each of the transistors Qtx52 and Qtx53 to increase the drain (source) potential Vant of each of the transistors Qtx52 and Qtx53 via the Schottky barrier of the gate.

By the increased drain potential Vant, charges are accumulated in the electrostatic capacitor elements 8 to 13 and 28 connected individually to the transmission signal terminals 2b and 2c and to the reception signal terminals 2d to 2g via the resistors RD50 to RD53, RD54 to RD57, and RD58 to RD64 connected between the drains and sources of the transistors Qtx52 and Qtx53.

FIG. 4B shows time-lapse variations in the gate-to-source (–drain) voltage Vgs (=gate potential Vg–drain potential Vant) in each of the transistors Qtx52 and Qtx53.

As shown in the drawing, the gate-to-source voltage Vgs is positive (about +0.35 V) during the period in which the high power is inputted so that a loss resulting from the turning ON of each of the transistors Qtx52 and Qtx53 is small.

When the input power switches to the small power level (about 5 dBm) at the time 2.5 μsec, the gate potential Vg begins to lower to about 2.8 V, which is the voltage applied to the control terminal 2i.

As shown in the drawing, the drain (source) potential Vant of each of the transistors Qtx52 and Qtx53 slowly lowers. The charge accumulated in each of the electrostatic capacitor elements 8 to 13 and 28 is discharged in a reverse leakage due to the Schottky barrier of the gate of each of the transistors.

Since the leakage current is extremely small (e.g., not more than 1 μA/mm), the drain potential Vant slowly lowers. As shown in FIG. 4B, the gate-to-source (–drain) voltage Vg (=gate potential Vg–drain potential Vant) of each of the transistors Qtx52 and Qtx53 is reversely biased till it exceeds the threshold voltage Vth of the transistor after power switching so that each of the transistors Qtx52 and Qtx53 that has been in the ON state during the supply of the high power is brought into the OFF state and the loss is increased disadvantageously.

The foregoing is the result of simulating the case where the low-power slot comes immediately after the high-output slot with no time interval therebetween. In an actual application, however, there is an interval of 34.2 μs between transmission slots. In spite of this, the lowering of the drain potential Vant remains slow and the gate-to-source (–drain) voltage Vgs of each of the transistors Qtx52 and Qtx53 remains reversely biased.

Figure 16:
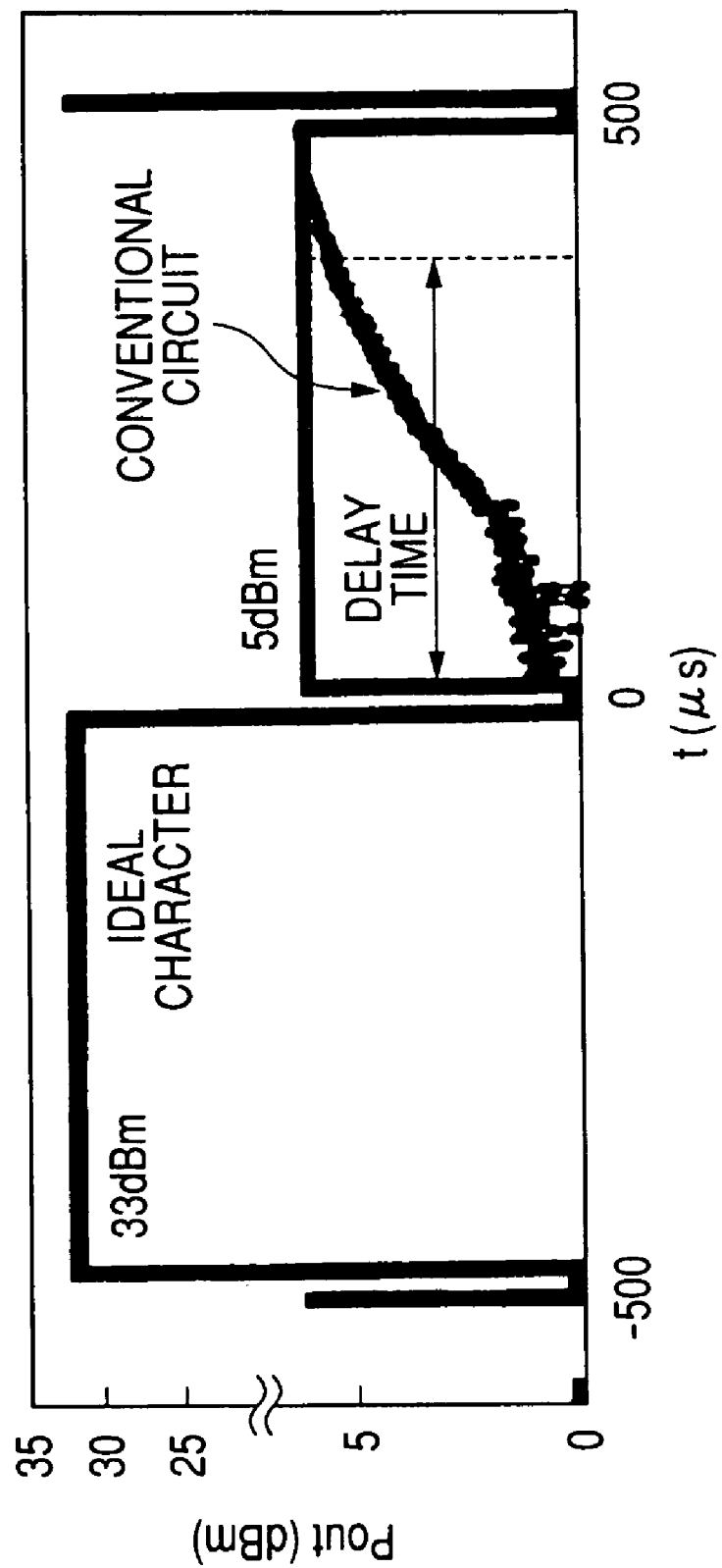
FIG. 16 is an illustrative view showing a slot timing relative to power at the output terminal of the switch examined by the present inventors.

Consequently, even in an actual application, the output power does not sufficiently rise when the inputting of the high power (high-power slot) has ended and the low power (low-power slot) is inputted after a given period of time. As a result, the rising delay shown in FIG. 16 may appear to cause a communication error or the like. The delay is eliminated at the time at which the gate-to-source (–drain) voltage Vgs nearly equals 0 V (reference potential Vss) and the loss in each of the transistors Qtx52 and Qtx53 is reduced. Since the elimination of the delay thus requires a time of about 100 μsec, the gate-to-source (–drain) voltage Vgs does not rebound to a level nearly equal to 0 V within the interval between the transmission slots mentioned above and the delay cannot be eliminated. This results in the phenomenon of the rising delay.

A description will be given to the effect when the resistor 27 for leak path is provided in the SPDT switch 2 according to the present embodiment.

In FIG. 2, the path indicated by the dotted line represents a leak path formed by providing the resistor 27 for leak path. By connecting the resistor 27 for leak path and thereby forming a discharge path, the charge accumulated in each of the electrostatic capacitor elements 8 to 13 and 28 can be discharged promptly.

The charges accumulated in the electrostatic capacitor elements 8 to 13 and 28 as the DC cut capacitors connected to the transmission signal terminals 2b and 2c and to the reception signal terminals 2d to 2g flow into the resistor 27 for leak path via the resistors Rd1 to Rd4, Rd5 to Rd8, and Rd9 to Rd15 connected between the drains and sources of the transistors Qtx1, Qtx2, Qtx3, Qtx4, and Qrx1 to Qrx5.

FIGS. 5A and 5B show the result of simulating time-lapse variations in the gate potential Vg and drain potential (antenna potential) Vant in each of the transistors Qtx3 and Qtx4 of the SPDT switch 2.

FIG. 5A shows the transient response characteristic of gate potential Vg vs. drain (antenna) potential Vant in each of the transistors Qtx3 and Qtx4. Similarly to FIG. 4A, FIG. 5A shows time-lapse variations in the gate potential Vg and drain (source) potential Vant of each of the transistors Qtx3 and Qtx4 when the input power is switched from the high power of about 33 dBm to the low power of about 5 dBm at the time 2.5 μsec.

FIG. 5B shows time-lapse variations in the gate-to-source (–drain) voltage Vgs (=gate potential Vg–drain potential Vant) in each of the transistors Qtx3 and Qtx4.

In this case, as can be seen from FIGS. 5A and 5B, the drain potential Vant has lowered more rapidly than in FIGS. 4A and 4B and the delay time has been reduced to ¹⁄₁₀ or less of the delay time in FIGS. 4A and 4B.

The time at which the gate-to-source (–drain) voltage Vgs nearly equals 0 V (reference potential VSS) and the loss in each of the transistors Qtx52 and Qtx53 is reduced is about 10 μsec after the inputting of the high power (high-power slot) is ended. Since the gate-to-source (–drain) voltage Vgs rebounds to a level nearly equal to 0 V within the interval between the transmission slots mentioned above, the delay is eliminated, as shown by the line indicating the internal resistance 300 Ωk of FIG. 6.

The connection position of the resistor 27 for leak path may be other than that shown in FIG. 2 (FIG. 2, node a). The same effect is obtainable provided that the resistor 27 for leak path is connected, e.g., between the transmission signal terminal 2b and the reference potential VSS (FIG. 2, node b), between the transmission signal terminal 2c and the reference potential VSS (FIG. 2, node c), between the other connecting portion of the transistor Qrx1 and the reference potential VSS (FIG. 2, node d), or between any one of the reception signal terminals 2d to 2g and the reference potential VSS (FIG. 2, node e).

However, since the important characteristic items of the antenna switch include harmonic distortion (second harmonic distortion (hereinafter referred to as 2HD)), third harmonic distortion (hereinafter referred to as 3HD), and insertion loss, the connection position thereof is limited.

FIG. 6 is a view showing the result of actually measuring the dependence of a delay time in the rising of the output power (Pout) on the resistor 27 for leak path when the low-power (about 5 dBm) slot comes immediately after the high-power (about 33 dBm) slot.

The rising characteristics were evaluated (1) when the resistor 27 for leak path was unconnected (FIG. 3), (2) the resistance value thereof was 910 KΩ, (3) the resistance value thereof was 510 KΩ, and (4) the resistance value thereof was 300 KΩ. In an ideal case, the 5 dBm low-power slot subsequent to the 33 dBm slot presents a rectangular waveform. However, as can be seen from the drawing, the delay time reaches a level which satisfies the specifications when the resistance value is not more than 300 KΩ.

Next, a simulation was performed to analyze the deterioration of an insertion loss caused by connecting the resistor 27 for leak path. The result of the simulation was shown in FIG. 7.

In contrast to FIG. 3 which shows the insertion loss when the resistor 27 for leak path is unconnected, FIG. 7 shows amounts of variations in insertion loss when the resistor for leak path is grounded during transmission and when the resistor for leak path is grounded during reception.

Although FIG. 7 shows the deterioration of the insertion loss during reception, the lowering of the insertion loss is preferably minimized. For this reason, the lower limit resistance value of the resistor 27 for leak path was set to 300 KΩ.

In the SPDT switch 2, a simulation was performed on the 2HD and the 3HD in each of the frequency bands for the GSM system and the PCS system at the different connection positions (nodes a to e) of the resistor 27 for leak path. FIG. 8 shows amounts of variations in harmonic distortions (2HD, 3HD) by using, as a reference, the amounts of variations in harmonic distortions (2HD, 3HD) in the SPDH switch 50 (FIG. 3), which is a conventional circuit provided with no resistor 27 for leak path.

At the node a, the harmonic distortions slightly improved in either of the frequency bands. The node b as one of the connection positions to a transmission system shows an excellent result with respect to an input from the Tx1 (the frequency band for the GSM system) but shows significant deterioration with respect to an input from the Tx2 (the frequency band for the PCS system). The node c as the other connection position to the transmission system shows the results opposite to those shown by the node b. According to the results, the most optimal position for each of the GSM/PCS bands is the node a, followed by the nodes c, e, and d or b as the progressively less optimal positions in this order, of which the nodes d and b are nearly equal in optimality (node a>node c>node e>node d or b).

FIG. 9 is a circuit diagram of the SPDT switch 2 in an exemplary case where the resistor 27 for leak path is connected at the node c, i.e., between the transmission signal terminal 2c and the reference potential VSS.

In this case, the SPDT switch 2 has the same connection configuration as in FIG. 2 except for the connection position of the resistor 27 for leak path. By thus connecting the resistor 27 for leak path, the charges accumulated in the electrostatic capacitor elements 8 to 13 and 28 flow into the resistor 27 for leak path via the resistors Rd1 to Rd4, Rd5 to Rd8, and Rd9 to Rd15. This allows rapid lowering of the drain potential Vant.

As a result, the time required by the gate-to-source (-drain) voltage Vgs of the transistor in the ON state to become negative can be reduced and a delay in the rising of the output power can be prevented.

FIG. 10 is a circuit diagram of the SPDT switch 2 in an exemplary case where the resistor 27 for leak path is connected at the node e, i.e., between any one of the reception signal terminals 2d to 2g and the reference potential VSS (between the reception signal terminal 2e and the reference potential VSS in FIG. 9).

In this case also, the SPDT switch 2 has the same connection configuration as shown in FIG. 2 except for the connection position of the resistor 27 for leak path. Accordingly, the charges accumulated in the electrostatic capacitor elements 8 to 13 and 28 flow to the resistor 27 for leak path via the resistors Rd1 to Rd4, Rd5 to Rd8, and Rd9 to Rd15. This allows rapid lowering of the drain potential Vant.

FIGS. 11 to 13 are cross-sectional views showing a process flow in the resistor 27 for leak path.

First, as shown in FIG. 11, a GaAs epitaxial layer 30 is formed on a substrate 29 made of semi-insulating gallium arsenide (GaAs). A buffer layer 31 is formed on the upper surface of the epitaxial layer 30.

An aluminum gallium arsenide (AlGaAs) layer 32 is formed on the upper surface of the buffer layer 31. An n-type gallium arsenide (GaAs) layer 33 is formed on the upper surface of the AlGaAs layer 32.

After the respective portions of the AlGaAs layer 32 and the n-type GaAs layer 33 which are located on the right-hand side of FIG. 12 are etched, an insulating film 34 composed of a PSG (PhosphoSilicate Glass)/SiO multilayer is formed. Then, the resistor 27 for leak path made of, e.g., WSiN is formed on the insulating film 34 to be located at a position at which the AlGaAs layer 32 and the n-type GaAs layer 33 were partly etched.

Subsequently, the portions of the insulating film 34 which are located at positions at which source/drain lines H1 and H2 are placed are etched and the source/drain lines H1 and H2 are formed from metal wires or the like. The source/drain line H1 is connected to the transistor Qtx2, while the source/drain line H2 is connected to the transistor Qtx1.

Then, as shown in FIG. 13, the portions of the insulating film 34 which are located at positions at which first and second gates are placed are etched in the region interposed between the source/drain lines H1 and H2. Thereafter, gate lines G1 and G2 connected to the two gates are similarly formed from metal wires and a power supply line SH to which an $n^+$ power supply pad not shown is connected is formed to be interposed between the gate lines G1 and G2.

The gate line G1 is connected to one of the gates of the transistor Qtx1, while the gate line G2 is connected to the other gate of the transistor Qtx1. The $n^+$ power supply pad SP is an electrode connected to the power supply line SH for supplying an intermediate potential between the two gates of the transistor Qtx1.

By thus providing the resistor 27 for leak path in the SPDT switch 2, the present embodiment can prevent a delay in the rising of the output power, while reducing the harmonic distortions. As a result, the reliability of each of the SPDT switch 2 and the high frequency power amplifier module 1 can be improved.

Although the invention achieved by the present inventors has thus been described specifically with reference to the embodiments thereof, the present invention is not limited thereto. It will be easily appreciated that various changes and modifications can be made in the invention without departing from the gist thereof.

The present invention is suited to a technology for reducing harmonic distortions in a SPDT switch used in a communication system such as mobile phone.

What is claimed is:

1. A semiconductor integrated circuit device used in mobile communication equipment, said semiconductor integrated circuit device comprising:
    a first terminal coupled to an antenna;
    a second terminal coupled to a signal processing circuit;
    a switching transistor disposed between said first and second terminals to switch a connection between said first and second terminals;
    a third terminal coupled to a control circuit for generating a control signal for said switching transistor;
    a voltage booster circuit which latches a transmission signal outputted via said switching transistor when the control signal is inputted via said third terminal, generates a boosted voltage higher than a voltage level of the control signal, and applies the boosted voltage to a control terminal of said switching transistor; and
    a resistor for a leak path connected between said first terminal and a reference potential to discharge charge capacitances accumulated in electrostatic capacitor elements as DC cut capacitors connected individually to said first to third terminals.

2. A semiconductor integrated circuit device according to claim 1, wherein a resistance value of said resistor for a leak path is not less than 100 KΩ.

3. A semiconductor integrated circuit device used in mobile communication equipment, said semiconductor integrated circuit device comprising:
    a first terminal coupled to an antenna;
    a first transmission terminal coupled to a first transmission circuit;
    a second transmission terminal coupled to a second transmission circuit;
    a reception terminal coupled to a reception circuit;
        a first switching transistor disposed between said first terminal and said first transmission terminal to switch a connection between said first terminal and said first transmission terminal;
        a second switching transistor disposed between said first terminal and said second transmission terminal to switch a connection between said first terminal and said second transmission terminal;
        a third switching transistor disposed between said first terminal and said reception terminal to switch a connection between said first terminal and said reception terminal;
        a third terminal coupled to a control circuit for generating a control signal for each of said first and second switching transistors;
    a voltage booster circuit which latches a transmission signal outputted via said first or second switching transistor when the control signal is inputted via said third terminal, generates a boosted voltage higher than a voltage level of the control signal, and applies the boosted voltage to a control terminal of said first or second switching transistor; and
    a resistor for a leak path connected between said second transmission terminal and a reference potential to discharge charge capacitances accumulated in electrostatic capacitor elements as DC cut capacitors connected individually to said first and third terminals, said first and second transmission terminals, and said reception terminal.

4. A semiconductor integrated circuit device according to claim 3,
    wherein a GSM transmission signal inputted to said first transmission circuit is inputted to said first transmission terminal, and
    wherein a POS transmission signal inputted to said second transmission circuit is inputted to said second transmission terminal.

5. A semiconductor integrated circuit device used in mobile communication equipment, said semiconductor integrated circuit device comprising:
    a first terminal coupled to an antenna;
        a transmission terminal coupled to a transmission circuit;
        a plurality of reception terminals each coupled to a reception circuit;
        a transmission switching transistor disposed between said first terminal and said transmission terminal to switch a connection between said first terminal and said transmission terminal;
        a reception switching transistor disposed between said first terminal and each of said plurality of reception terminals to switch a connection between said first terminal and each of said plurality of reception terminals;
        a third terminal coupled to a control circuit for generating a control signal for said transmission switching transistor;
        a voltage booster circuit which latches a transmission signal outputted via said transmission switching transistor when the control signal is inputted via said third terminal, generates a boosted voltage higher than a voltage level of the control signal, and applies the boosted voltage to a control terminal of said transmission switching transistor; and
        a resistor for a leak path connected between any one of said plurality of reception terminals and a reference potential to discharge charge capacitances accumulated in electrostatic capacitor elements as DC cut capacitors connected individually to said first terminal, said transmission terminal, and said reception terminal.

6. A semiconductor integrated circuit device used in mobile communication equipment, said semiconductor integrated circuit device comprising:
    a first terminal coupled to an antenna;
        a first transmission terminal coupled to a first transmission circuit;
        a second transmission terminal coupled to a second transmission circuit;
        a reception terminal coupled to a reception circuit;
        a first switching transistor disposed between said first terminal and said first transmission terminal to switch a connection between said first terminal and said first transmission terminal;
        a second switching transistor disposed between said first terminal and said second transmission terminal to switch a connection between said first terminal and said second transmission terminal;
        a third switching transistor disposed between said first terminal and said reception terminal to switch a connection between said first terminal and said reception terminal;
        a third terminal coupled to a control circuit for generating a control signal for each of said first and second switching transistors;

a voltage booster circuit which latches a transmission signal outputted via said first or second switching transistor when the control signal is inputted via said third terminal, generates a boosted voltage higher than a voltage level of the control signal, and applies the boosted voltage to a control terminal of said first or second switching transistor; and a resistor for a leak path connected between said first transmission terminal and a reference potential to discharge charge capacitances accumulated in electrostatic capacitor elements as DC cut capacitors connected individually to said first and third terminals, said first and second transmission terminals, and said reception terminal.

7. A semiconductor integrated circuit device according to claim 6, wherein a GSM transmission signal inputted to said first transmission circuit is inputted to said first transmission terminal, and wherein a PCS transmission signal inputted to said second transmission circuit is inputted to said second transmission terminal.

8. A semiconductor integrated circuit device used in mobile communication equipment, said semiconductor integrated circuit device comprising:

a first terminal coupled to an antenna;

a transmission terminal coupled to a transmission circuit;

a plurality of reception terminals each coupled to a reception circuit;

a transmission switching transistor disposed between said first terminal and said transmission terminal to switch a connection between said first terminal and said transmission terminal;

a first reception switching transistor connected to said first terminal to switch a connection of said first terminal;

a second reception switching transistor connected between said first reception switching transistor and each of said plurality of reception terminals to switch a connection of each of said plurality of reception terminals;

a third terminal coupled to a control circuit for generating a control signal for said transmission switching transistor;

a voltage booster circuit which latches a transmission signal outputted via said transmission switching transistor when the control signal is inputted via said third terminal, generates a boosted voltage higher than a voltage level of the control signal, and applies the boosted voltage to a control terminal of said transmission switching transistor; and a resistor for a leak path connected between a reference potential and a connecting portion between said first reception switching transistor and any of said plurality of second reception switching transistors to discharge charge capacitances accumulated in electrostatic capacitor elements as DC cut capacitors connected individually to said first terminal, said transmission terminal, and said plurality of reception terminals.

9. A high frequency power amplifier module comprising:

an antenna connection switching circuit; and a high frequency power amplifier which receives a transmission signal from a transmission circuit, amplifies the transmission signal, and supplies the amplified transmission signal to said antenna connection switching circuit, wherein said antenna connection switching circuit comprises:

a first terminal coupled to an antenna;

a transmission terminal coupled to the high frequency power amplifier;

a reception terminal coupled to a reception circuit;

a switching transistor disposed between said first terminal and said transmission terminal to switch a connection between said first terminal and said transmission terminal;

a third terminal coupled to a control circuit for generating a control signal for said switching transistor;

a voltage booster circuit which latches the transmission signal outputted via said switching transistor when the control signal is inputted via said third terminal, generates a boosted voltage higher than a voltage level of the control signal, and applies the boosted voltage to a control terminal of said first switching transistor; and a resistor for a leak path connected between said first terminal and a reference potential to discharge charge capacitances accumulated in electrostatic capacitor elements as DC cut capacitors connected individually to said first to third terminals.

10. A high frequency power amplifier module according to claim 9, wherein a resistance value of said resistor for a leak path is not less than 100 KΩ.

11. A high frequency power amplifier module comprising:

an antenna connection switching circuit; and high frequency power amplifiers which receive respective transmission signals from first and second transmission circuits, amplify the transmission signals, and supply the amplified transmission signals to said antenna connection switching circuit, wherein said antenna connection switching circuit comprises:

a first terminal coupled to an antenna;

first and second transmission terminals coupled to said high frequency power amplifiers;

a reception terminal coupled to a reception circuit;

a first switching transistor disposed between said first terminal and said first transmission terminal to switch a connection between said first terminal and said first transmission terminal;

a second switching transistor disposed between said first terminal and said second transmission terminal to switch a connection between said first terminal and said second transmission terminal;

a third switching transistor disposed between said first terminal and said reception terminal to switch a connection between said first terminal and said reception terminal;

a third terminal coupled to a control circuit for generating a control signal for each of said first and second switching transistors;

a voltage booster circuit which latches the transmission signal outputted via said first or second switching transistor when the control signal is inputted via said third terminal, generates a boosted voltage higher than a voltage level of the control signal, and applies the boosted voltage to a control terminal of said first or second switching transistor; and a resistor for a leak path connected between said second transmission terminal and a reference potential to discharge charge capacitances accumulated in electrostatic capacitor elements as DC cut capacitors connected individually to said first and third terminals, said first and second transmission terminals, and said reception terminal.

12. A high frequency power amplifier module according to claim 11,
wherein the high frequency power amplifier connected to said first transmission terminal outputs a GSM transmission signal, and
wherein the high frequency power amplifier connected to said second transmission terminal outputs a PCS transmission signal.

13. A high frequency power amplifier module comprising:
an antenna connection switching circuit; and
a high frequency power amplifier which receives a transmission signal from each of first and second transmission circuits, amplifies the transmission signal, and supplies the amplified transmission signal to said antenna connection switching circuit,
wherein said antenna connection switching circuit comprises:
a first terminal coupled to an antenna;
a transmission terminal coupled to said high frequency power amplifier;
a plurality of reception terminals each coupled to a reception circuit;
a transmission switching transistor disposed between said first terminal and said transmission terminal to switch a connection between said first terminal and said transmission terminal;
a reception switching transistor disposed between said first terminal and each of said plurality of reception terminals to switch a connection between said first terminal and each of said reception terminals;
a third terminal coupled to a control circuit for generating a control signal for said transmission switching transistor;
a voltage booster circuit which latches the transmission signal outputted via said transmission switching transistor when the control signal is inputted via said third terminal, generates a boosted voltage higher than a voltage level of the control signal, and applies the boosted voltage to a control terminal of said transmission switching transistor; and
a resistor for a leak path connected between any one of said plurality of reception terminals and a reference potential to discharge charge capacitances accumulated in electrostatic capacitor elements as DC cut capacitors connected individually to said first terminal, said transmission terminal, and said reception terminal.

14. A high frequency power amplifier module comprising:
an antenna connection switching circuit; and
high frequency power amplifiers which receive respective transmission signals from first and second transmission circuits, amplify the transmission signals, and supply the amplified transmission signals to said antenna connection switching circuit,
wherein said antenna connection switching circuit comprises:
a first terminal coupled to an antenna;
first and second transmission terminals coupled to said high frequency power amplifiers;
a reception terminal coupled to a reception circuit;
a first switching transistor disposed between said first terminal and said first transmission terminal to switch a connection between said first terminal and said first transmission terminal;
a second switching transistor disposed between said first terminal and said second transmission terminal to switch a connection between said first terminal and said second transmission terminal;
a third switching transistor disposed between said first terminal and said reception terminal to switch a connection between said first terminal and said reception terminal;
a third terminal coupled to a control circuit for generating a control signal for each of said first and second switching transistors;
a voltage booster circuit which latches the transmission signal outputted via said first or second switching transistor when the control signal is inputted via said third terminal, generates a boosted voltage higher than a voltage level of the control signal, and applies the boosted voltage to a control terminal of said first or second switching transistor; and
a resistor for a leak path connected between said first transmission terminal and a reference potential to discharge charge capacitances accumulated in electrostatic capacitor elements as DC cut capacitors connected individually to said first and third terminals, said first and second transmission terminals, and said reception terminal.

15. A high frequency power amplifier module according to claim 14,
wherein the high frequency power amplifier connected to said first transmission terminal outputs a GSM transmission signal, and
wherein the high frequency power amplifier connected to said second transmission terminal outputs a PCS transmission signal.

16. A high frequency power amplifier module comprising:
an antenna connection switching circuit; and
a high frequency power amplifier which receives a transmission signal from each of first and second transmission circuits, amplifies the transmission signal, and supplies the amplified transmission signal to said antenna connection switching circuit,
wherein said antenna connection switching circuit comprises:
a first terminal coupled to an antenna;
a transmission terminal coupled to said high frequency power amplifier;
a plurality of reception terminals each coupled to a reception circuit;
a transmission switching transistor disposed between said first terminal and said transmission terminal to switch a connection between said first terminal and said transmission terminal;
a first reception switching transistor connected to said first terminal to switch a connection of said first terminal;
a plurality of second reception switching transistors connected between said first reception switching transistor and each of said plurality of respective reception terminals to switch a connection of each of said plurality of reception terminals;
a third terminal coupled to a control circuit for generating a control signal for said transmission switching transistor;
a voltage booster circuit which latches the transmission signal outputted via said transmission switching transistor when the control signal is inputted via said third terminal, generates a boosted voltage higher than a voltage level of the control signal, and applies the boosted voltage to a control terminal of said transmission switching transistor; and a resistor for a leak path connected between a reference potential and a connecting portion between said first reception switching transistor and any of said plurality of second reception switching transistors to discharge charge capacitances accumulated in electrostatic capacitor elements as DC cut capacitors connected to said first terminal, said transmission terminal, and said plurality of reception terminals.

* * * * *